(12) United States Patent
Zhou et al.

(10) Patent No.: US 9,723,623 B2
(45) Date of Patent: Aug. 1, 2017

(54) ACCESS POINT MANAGED CONCURRENT TRANSMISSIONS

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, Solana Beach, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 14/850,779

(22) Filed: Sep. 10, 2015

(65) Prior Publication Data

US 2016/0270106 A1   Sep. 15, 2016

Related U.S. Application Data

(60) Provisional application No. 62/131,653, filed on Mar. 11, 2015.

(51) Int. Cl.
| H04W 4/00 | (2009.01) |
| H04W 72/12 | (2009.01) |
| H04W 76/02 | (2009.01) |
| H04W 74/08 | (2009.01) |

(52) U.S. Cl.
CPC ....... *H04W 72/1263* (2013.01); *H04W 4/005* (2013.01); *H04W 72/121* (2013.01); *H04W 74/0808* (2013.01); *H04W 76/023* (2013.01)

(58) Field of Classification Search
CPC ............ H04W 72/12; H04W 72/1263; H04W 72/121; H04W 72/1268; H04W 72/1273; H04W 74/0808; H04W 74/0816; H04W 74/0825; H04W 76/023; H04W 4/005
See application file for complete search history.

(56) References Cited

U.S. PATENT DOCUMENTS

| 5,568,469 | A | * | 10/1996 | Sherer | H04L 12/413 370/238 |
| 6,331,756 | B1 | * | 12/2001 | Belliveau | H05B 37/029 315/316 |
| 6,493,335 | B1 | * | 12/2002 | Darcie | H04L 12/2801 370/344 |
| 9,204,464 | B2 | * | 12/2015 | Ji | H04W 74/0816 |
| 2002/0080739 | A1 | * | 6/2002 | Kuwahara | H04B 1/715 370/333 |
| 2004/0114562 | A1 | * | 6/2004 | Kim | H04W 28/14 370/338 |
| 2007/0070902 | A1 | * | 3/2007 | Elaoud | H04L 12/5695 370/231 |
| 2007/0195808 | A1 | * | 8/2007 | Ehrlich | H04L 45/04 370/408 |

(Continued)

OTHER PUBLICATIONS

International Search Report and Written Opinion for International Application No. PCT/US2016/017109, ISA/EPO, Date of Mailing May 3, 2016, 10 pgs.

*Primary Examiner* — Kevin Mew
(74) *Attorney, Agent, or Firm* — Toler Law Group, PC.

(57) ABSTRACT

An access point may schedule concurrent peer-to-peer transmissions for different stations in a basic service set (BSS) of an Institute of Electrical and Electronics Engineers (IEEE) 802.11 architecture.

26 Claims, 15 Drawing Sheets

(56) References Cited

U.S. PATENT DOCUMENTS

| | | | |
|---|---|---|---|
| 2010/0165907 A1* | 7/2010 | Chu | H04L 12/1868 370/312 |
| 2012/0106502 A1 | 5/2012 | Goldhamer | |
| 2012/0213122 A1* | 8/2012 | Gong | H04B 7/0452 370/254 |
| 2012/0300662 A1* | 11/2012 | Wang | H04W 72/02 370/252 |
| 2014/0328262 A1* | 11/2014 | Sampath | H04L 5/0073 370/329 |
| 2015/0078299 A1* | 3/2015 | Barriac | H04W 74/006 370/329 |
| 2015/0264578 A1* | 9/2015 | Chaves | H04W 74/0808 370/338 |
| 2015/0334752 A1* | 11/2015 | Li | H04W 74/0816 455/418 |
| 2016/0242144 A1* | 8/2016 | Adachi | H04W 72/04 |
| 2016/0270105 A1* | 9/2016 | Zhou | H04W 72/121 |
| 2016/0295603 A1* | 10/2016 | Li | H04W 74/0858 |

\* cited by examiner

ACCESS POINT MANAGED CONCURRENT TRANSMISSIONS

I. CLAIM OF PRIORITY

The present application claims priority from U.S. Provisional Patent Application No. 62/131,653 entitled "ACCESS POINT MANAGED CONCURRENT TRANSMISSIONS," filed Mar. 11, 2015, the contents of which are incorporated by reference in their entirety.

II. FIELD

The present disclosure is generally related to concurrent transmissions in a wireless network.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless devices in a basic service set (BSS) of a wireless network may communicate with other wireless devices in the BSS using peer-to-peer (P2P) links. However, multiple P2P links may contend for access to a medium when the P2P links use the same channel (e.g., the same frequency band). For example, if the P2P links are associated with a common access point, the P2P links may use the same channel to transmit and receive data. Thus, it may be increasingly difficult to concurrently transmit data over multiple P2P links in a BSS.

IV. SUMMARY

The present disclosure presents techniques and protocols that enable an access point to manage concurrent transmissions for stations in a basic service set (BSS). The access point may schedule a first station in a first group of stations to transmit data concurrently with a second station in a second group of stations. The access point may manage the transmissions to reduce the likelihood of interference (e.g., path loss) that may otherwise result from stations transmitting data concurrently.

In a particular aspect, a method for scheduling concurrent transmissions includes scheduling, at an access point, a first peer-to-peer transmission with respect to stations in a first group of stations during a first time period. The method also includes scheduling a second peer-to-peer transmission with respect to stations in a second group of stations during the first time period.

In another particular aspect, an access point includes a processor and a memory storing instructions that are executable by the processor to perform operations. The operations include scheduling a first peer-to-peer transmission with respect to stations in a first group of stations during a first time period. The operations further include scheduling a second peer-to-peer transmission with respect to stations in a second group of stations during the first time period.

In another particular aspect, a non-transitory computer-readable medium includes instructions for scheduling concurrent transmissions. The instructions, when executed by a processor at an access point, cause the processor to perform operations. The operations include scheduling a first peer-to-peer transmission with respect to stations in a first group of stations during a first time period and scheduling a second peer-to-peer transmission with respect to stations in a second group of stations during the first time period.

In another particular aspect, an apparatus includes means for scheduling a first peer-to-peer transmission with respect to stations in a first group of stations during a first time period. The apparatus further includes means for scheduling a second peer-to-peer transmission with respect to stations in a second group of stations during the first time period.

In another particular aspect, a method for scheduling concurrent transmissions includes scheduling, at an access point, a first station in a first group of stations and a second station in the first group of stations to perform peer-to-peer transmissions during a first time period. The second station defers to a transmission from the first station based on carrier sense multiple access (CSMA). The method also includes scheduling a third station in a second group of stations and a fourth station in the second group of stations to perform peer-to-peer transmissions during the first time period. The fourth station defers to a transmission from the third station based on CSMA.

In another particular aspect, an access point includes a processor and a memory storing instructions that are executable by the processor to perform operations. The operations include scheduling a first station in a first group of stations and a second station in the first group of stations to perform peer-to-peer transmissions during a first time period. The second station defers to a transmission from the first station based on carrier sense multiple access (CSMA). The operations also include scheduling a third station in a second group of stations and a fourth station in the second group of stations to perform peer-to-peer transmissions during the first time period. The fourth station defers to a transmission from the third station based on CSMA.

In another particular aspect, a non-transitory computer-readable medium includes instructions for scheduling concurrent transmissions. The instructions, when executed by a processor at an access point, cause the processor to perform operations. The operations include scheduling a first station in a first group of stations and a second station in the first group of stations to perform peer-to-peer transmissions during a first time period. The second station defers to a transmission from the first station based on carrier sense multiple access (CSMA). The operations also include scheduling a third station in a second group of stations and a fourth station in the second group of stations to perform peer-to-peer transmissions during the first time period. The fourth station defers to a transmission from the third station based on CSMA.

In another particular aspect, an apparatus includes means for scheduling a first station in a first group of stations and a second station in the first group of stations to perform peer-to-peer transmissions during a first time period. The second station defers to a transmission from the first station based on carrier sense multiple access (CSMA). The apparatus also includes means for scheduling a third station in a second group of stations and a fourth station in the second group of stations to perform peer-to-peer transmissions during the first time period. The fourth station defers to a transmission from the third station based on CSMA.

In another particular aspect, a method for scheduling concurrent transmissions in a wireless network includes generating transmission management data at an access point. The transmission management data includes decision criteria that enables a station to determine whether to concurrently transmit peer-to-peer data with an ongoing peer-to-peer transmission from another station after detecting the ongoing peer-to-peer transmission. The method also includes sending the transmission management data to the station.

In another particular aspect, an access point includes a processor and a memory storing instructions that are executable by the processor to perform operations. The operations include generating transmission management data. The transmission management data includes decision criteria that enables a station to determine whether to concurrently transmit peer-to-peer data with an ongoing peer-to-peer transmission from another station after detecting the ongoing peer-to-peer transmission. The operations further include sending the transmission management data to the station.

In another particular aspect, a non-transitory computer-readable medium includes instructions for scheduling concurrent transmissions in a wireless network. The instructions, when executed by a processor at an access point, cause the processor to perform operations. The operations include generating transmission management data. The transmission management data includes decision criteria that enables a station to determine whether to concurrently transmit peer-to-peer data with an ongoing peer-to-peer transmission from another station after detecting the ongoing peer-to-peer transmission. The operations also include sending the transmission management data to the station.

In another particular aspect, an apparatus includes means for generating transmission management data. The transmission management data includes decision criteria that enables a station to determine whether to concurrently transmit peer-to-peer data with an ongoing peer-to-peer transmission from another station after detecting the ongoing peer-to-peer transmission. The apparatus also includes means for sending the transmission management data to the station.

In another particular aspect, a method for scheduling concurrent transmissions in a wireless network includes generating transmission management data at an access point. The transmission management data includes decision criteria that enables a first group of peer-to-peer stations to select a first station in the first group of peer-to-peer stations to transmit data within the first group of peer-to-peer stations based on a carrier sense multiple access (CSMA) process and independently of transmission activity in the second group of peer-to-peer stations. The method also includes sending the transmission management data to the first group of peer-to-peer stations.

In another particular aspect, an access point includes a processor and a memory storing instructions that are executable by the processor to perform operations. The operations include generating transmission management data. The transmission management data includes decision criteria that enables a first group of peer-to-peer stations to select a first station in the first group of peer-to-peer stations to transmit data within the first group of peer-to-peer stations based on a carrier sense multiple access (CSMA) process and independently of transmission activity in the second group of peer-to-peer stations. The operations also include sending the transmission management data to the first group of peer-to-peer stations.

In another particular aspect, a non-transitory computer-readable medium includes instructions for scheduling concurrent transmissions in a wireless network. The instructions, when executed by a processor at an access point, cause the processor to perform operations. The operations include generating transmission management data. The transmission management data includes decision criteria that enables a first group of peer-to-peer stations to select a first station in the first group of peer-to-peer stations to transmit data within the first group of peer-to-peer stations based on a carrier sense multiple access (CSMA) process and independently of transmission activity in the second group of peer-to-peer stations. The operations also include sending the transmission management data to the first group of peer-to-peer stations.

In another particular aspect, an apparatus includes means for generating transmission management data. The transmission management data includes decision criteria that enables a first group of peer-to-peer stations to select a first station in the first group of peer-to-peer stations to transmit data within the first group of peer-to-peer stations based on a carrier sense multiple access (CSMA) process and independently of transmission activity in the second group of peer-to-peer stations. The apparatus also includes means for sending the transmission management data to the first group of peer-to-peer stations.

One advantage provided by at least one of the disclosed aspects is the ability for multiple stations (e.g., peer-to-peer transmitters) in a basic service set (BSS) to transmit data concurrently. For example, an access point may manage concurrent transmissions to reduce interference that the concurrent transmissions will cause to each other. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular aspects of the present disclosure are described with reference to the drawings. In the description, common features are designated by common reference numbers throughout the drawings.

Figure 1:
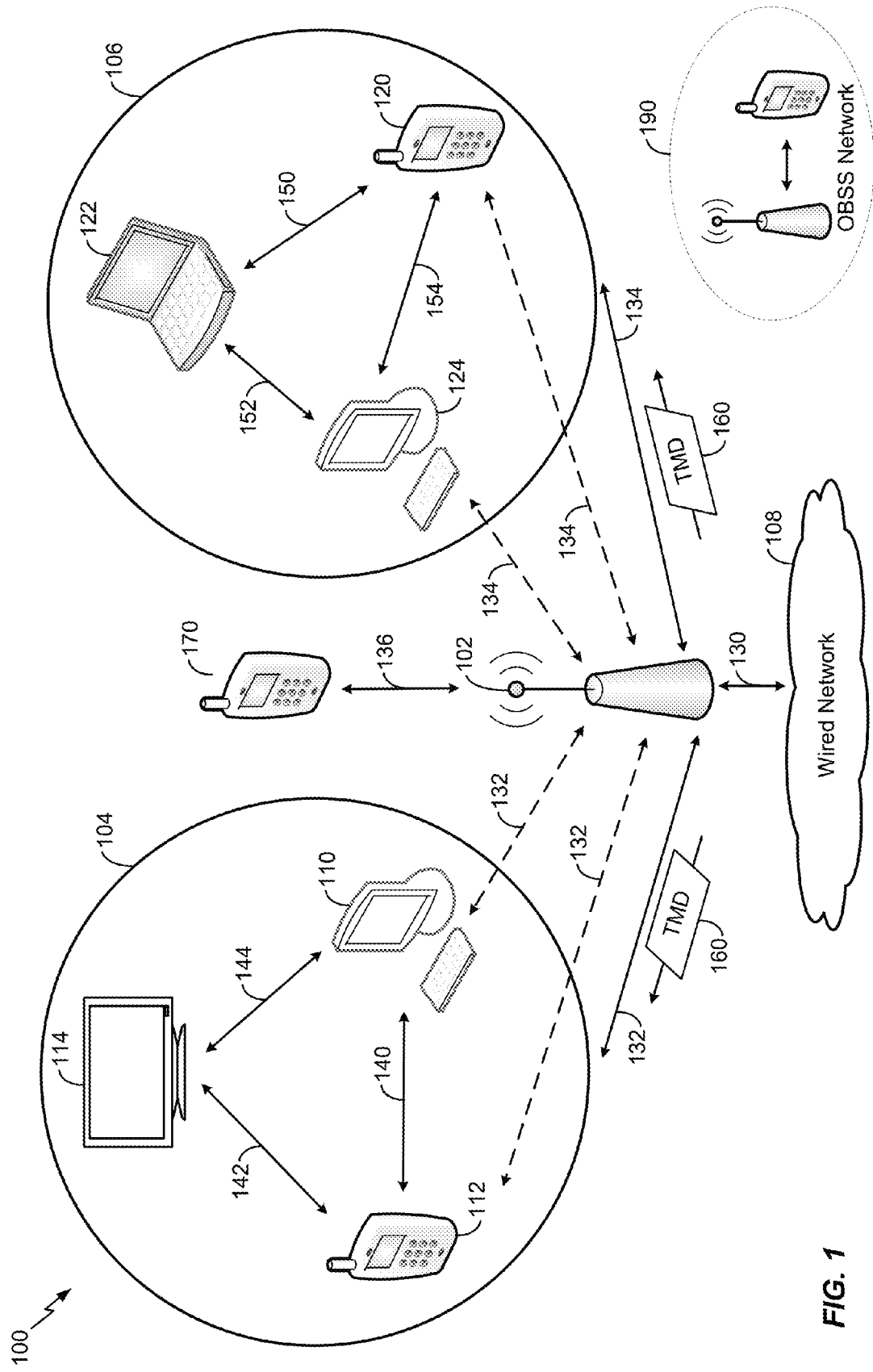
FIG. 1 is a diagram of a system that supports access point management of concurrent transmissions.

Referring to FIG. 1, a particular illustrative aspect of a system 100 that supports access point management of concurrent transmissions is shown. The system 100 may correspond to a basic service set (BSS) of an Institute of Electrical and Electronics Engineers (IEEE) 802.11 wireless local area network (WLAN) architecture. As used herein, a BSS may comprise an access point and nodes associated with the access point. In a particular aspect, the system 100 may operate according to an IEEE 802.11 protocol, such as the IEEE 802.11ax protocol.

The system 100 includes an access point 102, a first group of stations 104, a second group of stations 106, and a wired network 108 (e.g., an infrastructure). In a particular aspect, the first group of stations 104 may be located in a first area of a building (e.g., a house, an office building, etc.) and the second group of stations 106 may be located in a second area of the building. As a non-limiting illustrative example, the first group of stations 104 may be located in a bedroom of a home, and the second group of stations 106 may be located in a living room of the home. As used herein, a "group of stations" may also be used to refer to a group of peer-to-peer links between the stations or the group.

The first group of stations 104 includes a station 110, a station 112, and a station 114. As used herein, a "station" may also be referred to a peer-to-peer transmitter. In FIG. 1, the station 110 includes a computer, the station 112 includes a mobile phone, and the station 114 includes a television (e.g., a set top box). It should be understood that the stations 110-114 in the first group of stations 104 are merely non-limiting illustrative examples and additional (or fewer) devices/stations may be included in the first group of stations 104. Each station 110-114 in the first group of stations 104 may communicate (e.g., wirelessly transmit and receive data) with another station 110-114 in the first group of stations 104 via peer-to-peer (P2P) links. To illustrate, the station 110 may communicate with the station 112 via a P2P link 140, the station 112 may communicate with the station 114 via a P2P link 142, and the station 110 may communicate with the station 114 via a P2P link 144.

The second group of stations 106 includes a station 120, a station 122, and a station 124. In FIG. 1, the station 120 includes a mobile phone, the station 122 includes a laptop computer, and the station 124 includes a computer. It should be understood that the stations 120-124 in the second group of stations 106 are merely non-limiting illustrative examples and additional (or fewer) devices/stations may be included in the second group of stations 106. Each station 120-124 in the second group of stations 106 may communicate with another station 120-124 in the second group of stations 106 via P2P links. To illustrate, the station 120 may communicate with the station 122 via a P2P link 150, the station 122 may communicate with the station 124 via a P2P link 152, and the station 120 may communicate with the station 124 via a P2P link 154. As described below, the access point 102 may manage (e.g., schedule and/or provide data for station-initiated scheduling of) concurrent transmissions between the stations 110-114 in the first group of stations 104 and the stations 120-124 in the second group of stations 106.

The access point 102 may be operable to provide the stations 110-114 in the first group of stations 104 access to the wired network 108 and to provide the stations 120-124 in the second group of stations 106 access to the wired network 108. For example, the access point 102 may communicate (e.g., wirelessly transmit and receive signals) with the stations 110-114 in the first group of stations 104 via a wireless link 132, the access point 102 may communicate with the stations 120-124 in the second group of stations 106 via a wireless link 134, and the access point 102 may communicate with the wired network 108 via a link 130. Thus, each station 110-114 in the first group of stations 104 may communicate with the wired network 108 via the access point 102 (e.g., using the wireless link 132 and the link 130), and each station 120-124 in the second group of stations 106 may communicate with the wired network 108 via the access point 102 (e.g., using the wireless link 134 and the link 130). Additionally, each station 110-114 in the first group of stations 104 may communicate with each station 120-124 in the second group of stations 106 via the access point 102 (e.g., using the wireless links 132, 134).

The stations 110-114, 120-124 that wirelessly transmit data to (and receive data from) the access point 102 may be referred to as "infrastructure nodes" (e.g., network nodes or infrastructure stations). Infrastructure nodes are associated with the access point 102, and thus are included in the BSS. In a particular aspect, a P2P node may be an infrastructure node (e.g., may communicate with the access point 102). In another particular aspect, a P2P node may not be an infrastructure node (e.g., may not be able to communicate with the access point 102). The wireless transmissions between the access point 102 and the stations 110-114, 120-124 may be referred to as "infrastructure transmissions".

The access point 130 may be configured to manage concurrent transmissions between the stations 110-114 in the first group of stations 104 and between the stations 120-124 in the second group of stations 106. For example, the access point 102 may generate transmission management data (TMD) 160 to manage concurrent transmissions between the stations 110-114 in the first group of stations 104 and/or the stations 120-124 in the second group of stations 106. The transmission management data 160 may be transmitted to each station 110-114 in the first group of stations 104 via the wireless link 132 and/or transmitted to each station 120-124 in the second group of stations 106 via the wireless link 134.

According to a first aspect, the access point 102 may schedule one or more stations 110-114, 120-124 within the BSS to transmit concurrently. For example, the transmission management data 160 may be transmitted to each station 110-114 in the first group of stations 104 and to each station 120-124 in the second group of stations 106. According to the first aspect, the transmission management data 160 may identify time windows for each station 110-114, 120-124 to transmit data to another station using a P2P link. The first aspect is further described with respect to FIG. 13.

As a non-limiting example of the first aspect, the transmission management data 160 may indicate that the station 110 and the station 120 may concurrently transmit data during a first time window, that the station 112 and the station 122 may concurrently transmit data during a second time window, and that the station 114 and the station 124 may concurrently transmit data during a third time window. According to a "full reuse" mode of operation, stations may concurrently transmit data in their designated time window using a common channel without carrier sense multiple access (CSMA) (e.g., without verifying the existence of other traffic before transmitting). The "full reuse" mode of operation is further described with respect to FIGS. 2-12. According to an "orthogonal frequency-division multiple access (OFDMA)" mode, stations may concurrently transmit data in their designated time window using different channels. For example, at least two P2P links 140-144, 150-154 may have different channels. A station 110-114 in the first group of stations 104 may transmit data on a first channel and a station 120-124 in the second group of stations 106 may concurrently transmit data on a second channel. According to a "coordinated beamforming" mode, at least one station in one concurrent P2P link may transmit or receive data via beamforming so as to spatially cancel interference to or from another concurrent P2P link.

According to the first aspect, the access point 102 may specify operation parameters for each P2P link 140-144, 150-154 in the transmission management data 160. For example, the access point 102 may specify a transmission power, a transmission rate, a channel, a beamforming target node, or any combination thereof. Additionally, the access point 102 may schedule an infrastructure transmission (e.g., a downlink transmission and/or an uplink transmission) concurrent to a (e.g., previously) scheduled P2P transmission in the first group of stations 104 and/or in the second group of stations 106. For example, the access point 102 may transmit data to (or receive data from) an infrastructure station 170 via a link 136 (e.g., an infrastructure transmission) during the first time window, the second time window, the third time window, or any combination thereof. The access point 102 may also indicate in the transmission management data 160 that a scheduled P2P transmission is to defer to an ongoing overlapping basic service set (OBSS) transmission (e.g., a transmission in an OBSS network 190) in a time window of the scheduled P2P transmission.

According to a second aspect, the access point 102 may schedule time periods during which any station 110-114 in the first group of stations 104 may transmit data concurrently with any station 120-124 in the second group of stations 106. The transmitting station 110-114 in the first group of stations 104 may be determined by a CSMA process within the first group of stations 104, and the transmitting station 120-124 in the second group of stations 106 may be determined by a CSMA process within the second group of stations 106. The second aspect is further described with respect to FIG. 14.

To illustrate, the access point 102 may transmit the transmission management data 160 to each station 110-114 in the first group of stations 104 and to each station 120-124 in the second group of stations 106. The transmission management data 160 may identify a time window during which a single station 110-114 in the first group of stations 104 and a single station 120-124 in the second group of stations 106 may concurrently transmit data. Upon receiving the transmission management data 160, the stations 110-114 in the first group of stations 104 may perform a CSMA process to determine which station 110-114 will transmit during the time window identified by the transmission management data 160. Similarly, the stations 120-124 in the second group of stations 106 may perform a CSMA process to determine which station 120-124 will transmit during the time window identified by the transmission management data 160. During the CSMA processes, the stations 110-114 in the first group of stations 104 may ignore transmissions from the stations 120-124 in the second group of stations 106, and vice versa. The stations in the first group may identify the stations in the second group via the corresponding P2P group ID. The ID can be assigned by the AP and carried in the P2P frames exchanged within the corresponding group. The AP may inform each station its group ID via broadcast, multicast, or unicast frame.

According to the second aspect, the access point 102 may specify CSMA parameters and other operation parameters for each group of stations 104, 106 or for each individual station 110-114, 120-124. For example, the parameters may be included in the transmission management data 160. The CSMA parameters specified by the access point 102 may include Enhanced Distributed Channel Access (EDCA) parameters (e.g., parameters affecting the flow of traffic from the access point 102 to the stations 110-114, 120-124), energy detection thresholds, or any combination thereof, as illustrative non-limiting examples. The access point 102 may also specify (via the transmission management data 160) a transmission power, a transmission rate, a channel, a beamforming target node, or any combination thereof.

Additionally, according to the second aspect, the access point 102 may schedule an infrastructure transmission (e.g., a downlink transmission and/or an uplink transmission) with the station 170 concurrent to a (e.g., previously) scheduled P2P transmission in the first group of stations 104 and/or in the second group of stations 106. The infrastructure transmission may be scheduled with or without using CSMA. The access point 102 may also indicate in the transmission management data 160 that a scheduled P2P transmission is to defer to an ongoing overlapping basic service set (OBSS) transmission in a time window of the scheduled P2P transmission and/or defer to a BSS infrastructure transmission.

According to a third aspect, the access point 102 may provide configuration criteria to enable stations to determine (without CSMA) whether to concurrently transmit after detecting an ongoing transmission (e.g., an ongoing P2P transmission). The determination may be based on the decision criteria and the operation parameters identified by the access point 102. The third aspect is further described with respect to FIG. 15.

The decision criteria and the operation parameters may be included in the transmission management data 160. A first decision criterion may be whether the transmitting station of a P2P link will affect an ongoing P2P transmission. For example, whether the first decision criterion is satisfied may be based on whether a path loss from the station to a receiver in an ongoing P2P link exceeds a threshold. A second decision criterion may be whether the P2P link will be affected by an ongoing P2P transmission. For example, satisfaction of the second decision criterion may be based on whether a link signal-to-interference-plus-noise ratio (SINR) exceeds a threshold with interference from the ongoing P2P link. The operation parameters (e.g., the access point configured operations parameters included in the transmission management data 160) may include a transmission power, a transmission rate, a channel, a beamforming target node, or any combination thereof. Thus, in some aspects, the operation parameters may be dependent on ongoing P2P transmissions.

According to the third aspect, a station determining whether to transmit (e.g., whether to be a P2P transmitter) may identify station identifiers (IDs) (e.g., node IDs) of ongoing P2P transmissions from physical layer (PHY) headers and/or media access control (MAC) headers. The access point 102 may also indicate (via the transmission management data 160) to a station to defer to a BSS infrastructure transmission and/or an OBSS transmission. For example, the station will start the concurrent transmission if the medium is not reserved by a BSS infrastructure transmission and/or an OBSS transmission.

According to a fourth aspect, the access point 102 may provide configuration criteria to enable stations in the first group of stations 104 to determine (with CSMA) whether to concurrently transmit data independent of transmission activity within the second group of stations 106, and vice versa. The second group of stations 106 may be identified via a P2P group ID, as described above. The determination may be based on decision criteria and operations parameters identified by the access point 102. The fourth aspect is further described with respect to FIG. 16.

The decision criteria and the operation parameters may be included in the transmission management data 160. A first decision criterion may include whether a transmission in a first P2P group affects an "ignored" P2P group. For example, the first decision criterion may be based on the assumption that a P2P transmission in the first group of stations 104 does not affect the second group of stations 106 (e.g., the "ignored" P2P group). The first decision criterion may be based on whether a path loss from any transmitting station 110-114 in the first group of stations 104 to any receiving station 120-124 in the second group of stations 106 exceeds a threshold, or vice versa. A second decision criterion may include whether a transmission in the first P2P group is affected by a transmission in the "ignored" P2P group. For example, the second decision criterion may be based on the assumption that a P2P transmission in the first group of stations 104 is not affected by a P2P transmission in the second group of stations 106, or vice versa. The second decision criterion may be based on whether the SINR for any P2P link in the first group exceeds a threshold in presence of any P2P transmission in the second group, or vice versa.

According to the fourth aspect, the access point configured operation parameters may be used if the transmitting P2P group determines to ignore the other P2P groups. The access point configured operation parameters may include CSMA parameters, EDCA parameters, energy detection thresholds, or any combination thereof. The access point 102 may also indicate (via the transmission management data 160) a transmission power, a transmission rate, a channel, a beamforming target node, or any combination thereof. The parameters may be dependent on the ignored P2P groups.

According to the fourth aspect, a station determining whether to transmit may identify station IDs (e.g., node IDs) of ongoing P2P transmissions from PHY headers and/or MAC headers. The access point 102 may also indicate (via the transmission management data 160) to a station to defer to a BSS infrastructure transmission and/or an OBSS transmission.

The system 100 of FIG. 1 may thus enable the access point 102 to manage concurrent transmissions between the stations 110-114 in the first group of stations 104 and the stations 120-124 in the second group of stations 106. Managing concurrent transmissions for multiple groups in the AP's coverage may increase the general P2P transmission efficiency. For example, instead of each group transmitting at the normal high power to make the other group defer, the system 100 may enable the stations 110-114, 120-124 to transmit data concurrently with reduced power, so that the medium is reused by the two groups and hence the total P2P throughput is increased.

Unless otherwise noted, the following description of FIGS. 2-12 describes the "full reuse" mode of operation of the first aspect in FIG. 1. As described above, an access point may schedule stations (e.g., links) within a BSS to transmit concurrently. According to the "full reuse" mode of operation, stations may concurrently transmit data in the designated time window using a common channel without CSMA (e.g., without verifying the existence of other traffic before transmitting).

Figure 2:
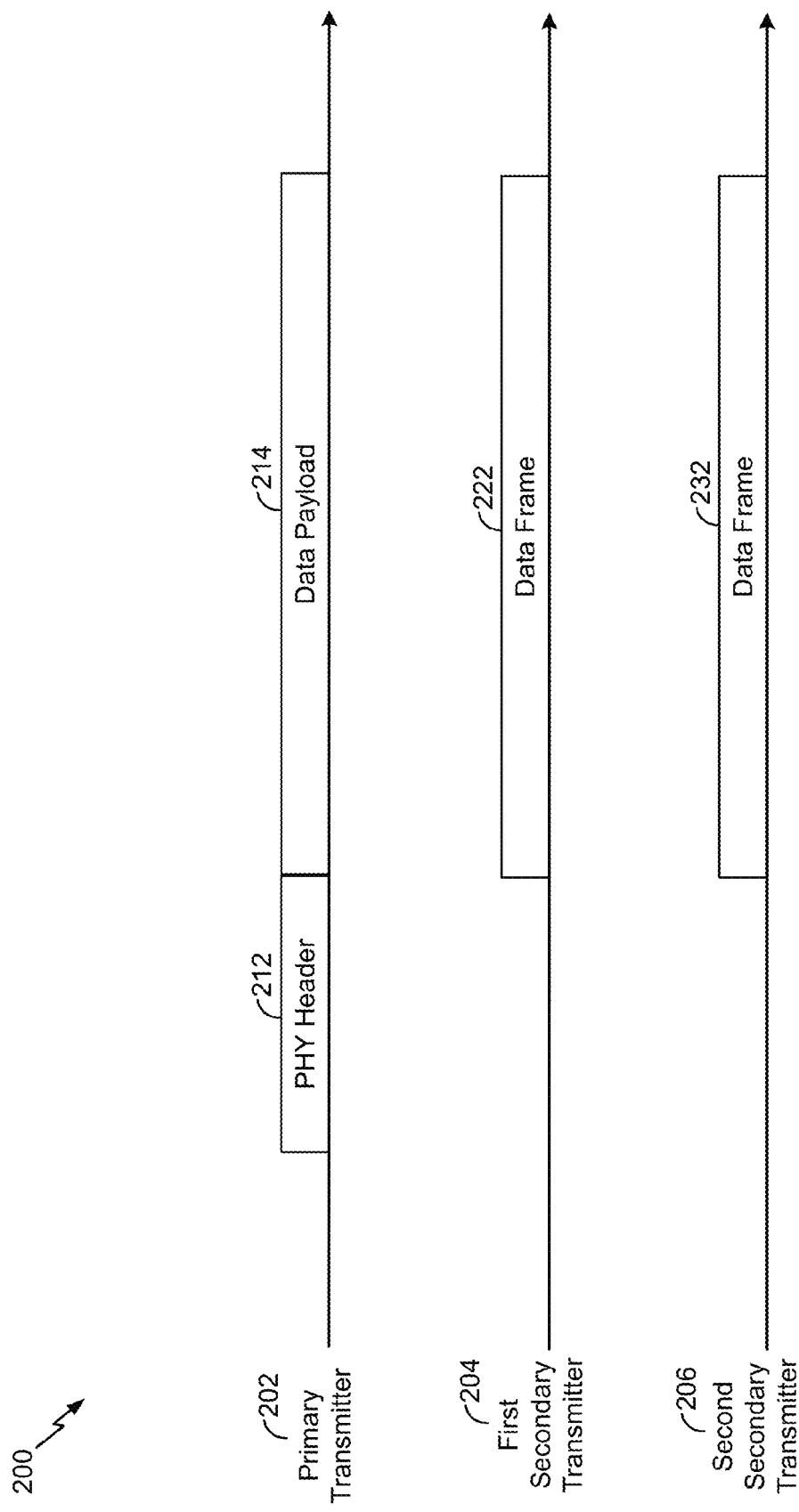
FIG. 2 is a scheduling chart for an access point managed peer-to-peer reuse operation.

Referring to FIG. 2, a particular illustrative aspect of a scheduling chart 200 for an access point managed peer-to-peer reuse operation is shown. The scheduling chart 200 illustrates transmission timings of a primary transmitter 202, transmission timings of a first secondary transmitter 204, and transmission timings of a second secondary transmitter 206. The clocks of the primary transmitter 202, the first secondary transmitter 204, and the second secondary transmitter 206 may be synchronized.

In a particular aspect, the primary transmitter 202 may be an access point, the first secondary transmitter 204 may be a first P2P transmitter, and the second secondary transmitter 206 may be a second P2P transmitter. For example, the primary transmitter 202 may be the access point 102 of FIG. 1, the first secondary transmitter 204 may be the station 110 of FIG. 1, and the second secondary transmitter 206 may be the station 120 of FIG. 1. In another particular aspect, the primary transmitter 202 may be the first P2P transmitter, the first secondary transmitter 204 may be the access point, and the second secondary transmitter 206 may be the second P2P transmitter. In another particular aspect, the primary transmitter 202 may be a station (e.g., an infrastructure node transmitting to an access point in an uplink), the first secondary transmitter 204 may be the first P2P transmitter, and the second secondary transmitter 206 may be the second P2P transmitter. Thus, the primary transmitter 202 may be any node in an access point's coverage area.

According to the scheduling chart 200, the primary transmitter 202 may initiate the "full reuse" mode of operation and may send a schedule (e.g., a transmission schedule) to the first secondary transmitter 204 and to the second secondary transmitter 206. For example, the schedule may be transmitted in a PHY header 212 by the primary transmitter 202 at a first time. The schedule may indicate that the each transmitter 202-206 is to transmit data on the same channel at a second time (e.g., during the same time window). The schedule may be transmitted to each secondary transmitter 204, 206. At the second time, the primary transmitter 202 may transmit a data payload 214, the first secondary transmitter 204 may transmit a data frame 222, and the second secondary transmitter 206 may transmit a data frame 232. The data payload 214, the data frame 222, and the data frame 232 may be transmitted on a common channel (e.g., a common frequency band).

Figure 3:
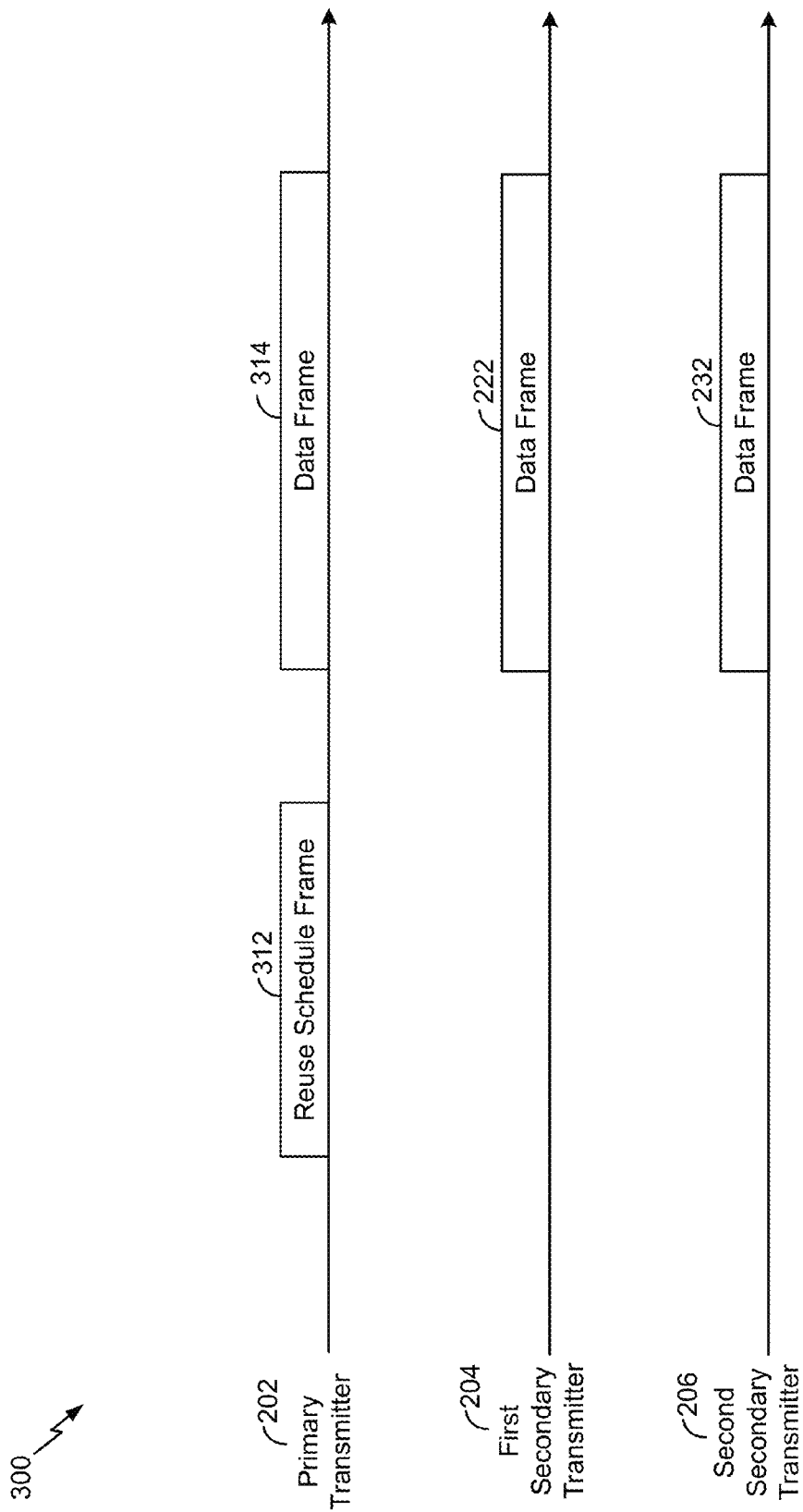
FIG. 3 is another scheduling chart for an access point managed peer-to-peer reuse operation.

Referring to FIG. 3, another particular illustrative aspect of a scheduling chart 300 for an access point managed peer-to-peer reuse operation is shown. The scheduling chart 300 illustrates transmission timings of the primary transmitter 202, the first secondary transmitter 204, and the second secondary transmitter 206.

According to the scheduling chart 300, the primary transmitter 202 may initiate the "full reuse" mode of operation and may transmit a reuse schedule frame 312 to the first secondary transmitter 204 and to the second secondary transmitter 206 at a first time. The reuse schedule frame 312 may indicate that each transmitter 202, 204, 206 is to transmit data on the same channel at a second time (e.g., during the same time window). At the second time, the primary transmitter 202 may transmit a data frame 314, the first secondary transmitter 204 may transmit the data frame 222, and the second secondary transmitter 206 may transmit the data frame 232. In a particular aspect, padding may be added at the end of the reuse schedule frame 312 to give the secondary transmitters 204, 206 additional time to generate the data frames 222, 232.

Figure 4:
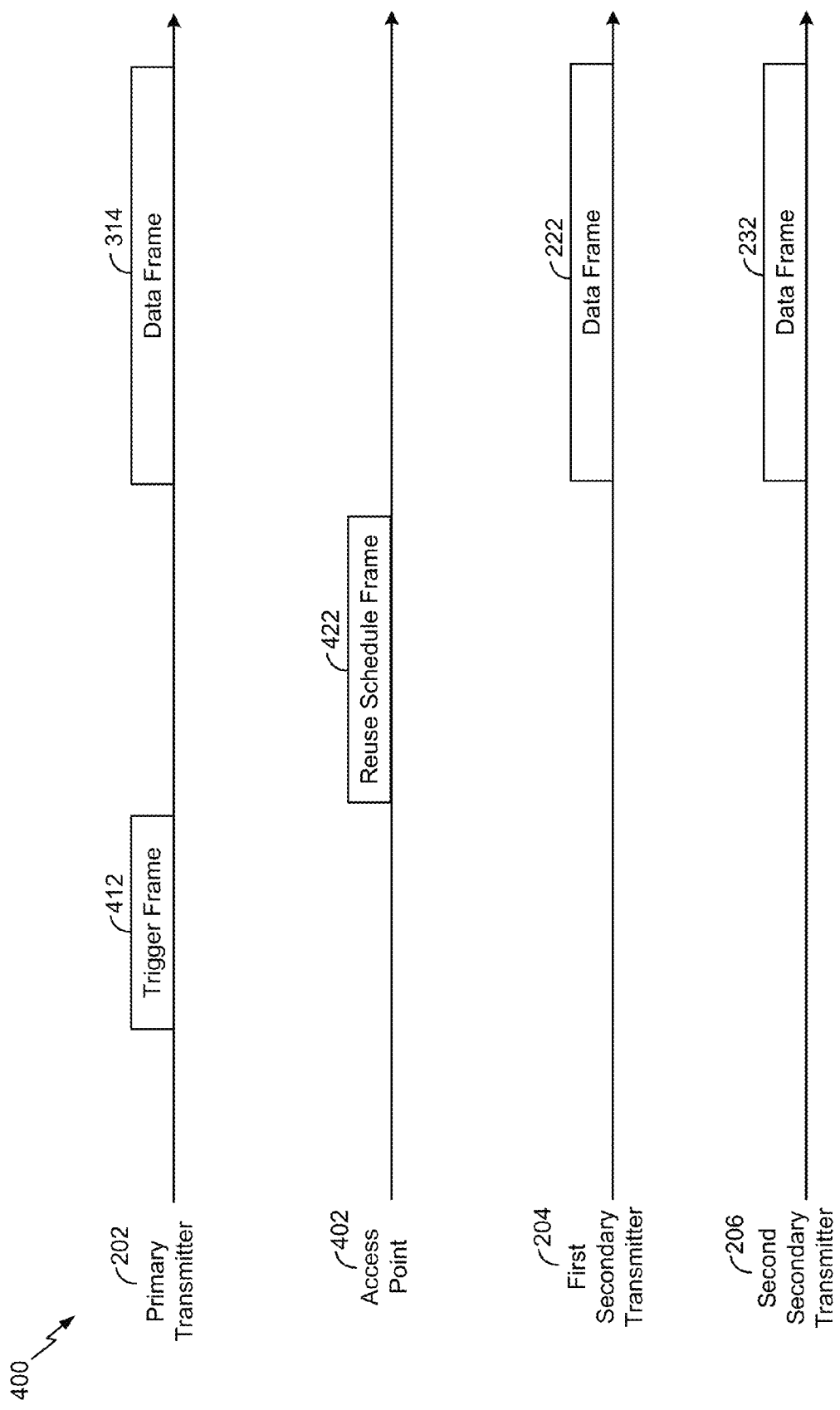
FIG. 4 is another scheduling chart for an access point managed peer-to-peer reuse operation.

Referring to FIG. 4, another particular illustrative aspect of a scheduling chart 400 for an access point managed peer-to-peer reuse operation is shown. The scheduling chart 400 illustrates transmission timings of the primary transmitter 202, transmission timings of an access point 402, transmission timings of the first secondary transmitter 204, and transmission timings of the second secondary transmitter 206. In a particular aspect, the access point 402 may correspond to the access point 102 of FIG. 1.

According to the scheduling chart 400, the primary transmitter 202 sends a trigger frame 412 to the access point 402 on a designated channel at a first time. According to the illustrative aspect of FIG. 4, the primary transmitter 202 is a non-access point node (e.g., a P2P node or a station). Upon receiving the trigger frame 412 on the designated channel, the access point 402 may transmit a reuse schedule frame 422 to the transmitters 202, 204, 206 on the same channel at a second time. The reuse schedule frame 422 may indicate that each transmitter 202, 204, 206 is to transmit data on the same channel at a third time (e.g., during the same time window). At the third time, the primary transmitter 202 may transmit the data frame 314, the first secondary transmitter 204 may transmit the data frame 222, and the second secondary transmitter 206 may transmit the data frame 232 on the same channel. Thus, based on the schedule in the reuse schedule frame 422, the primary and secondary transmitters 202, 204, 206 may simultaneously transmit data on the same channel.

Figure 5:
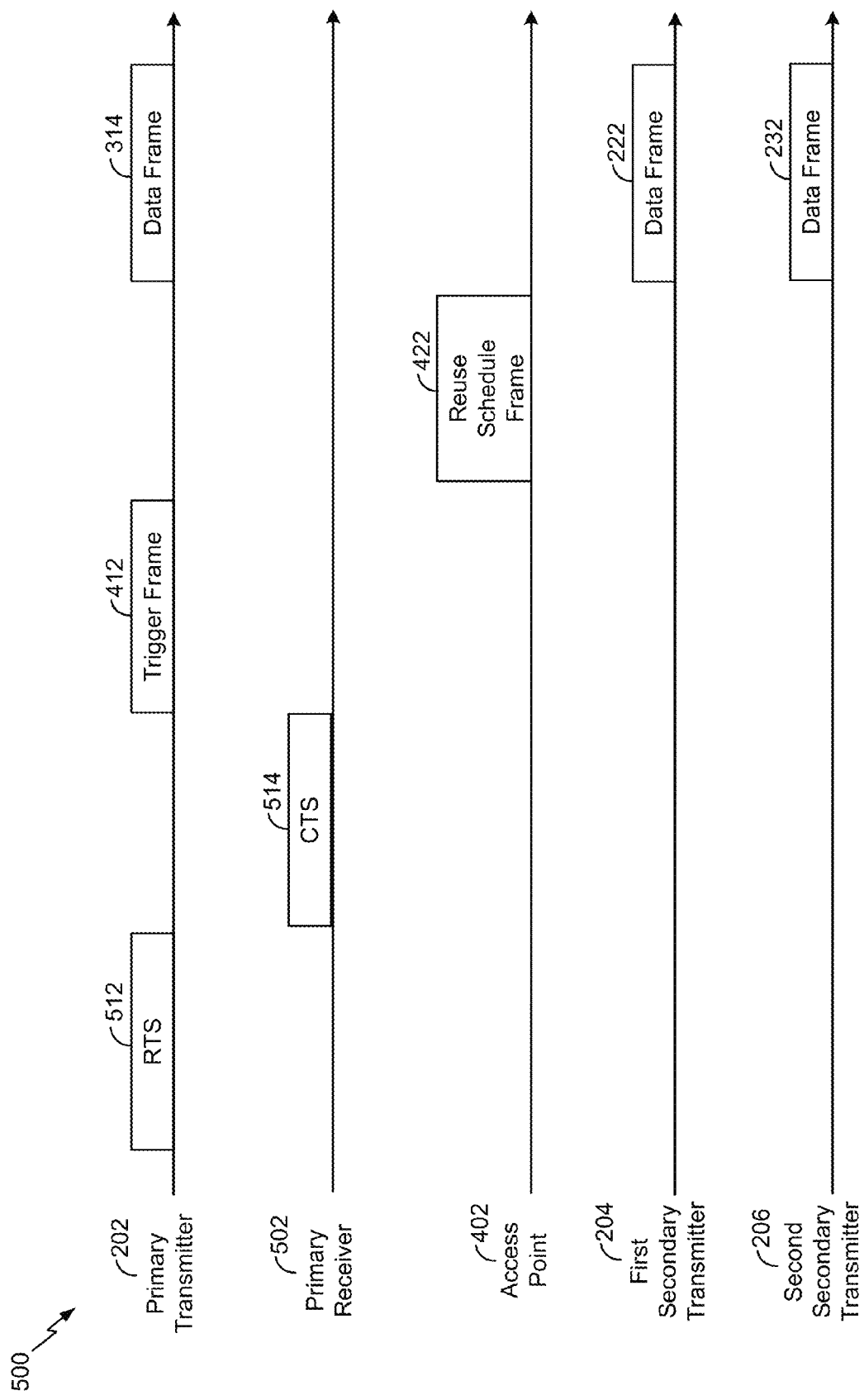
FIG. 5 is another scheduling chart for an access point managed peer-to-peer reuse operation.

Referring to FIG. 5, another particular illustrative aspect of a scheduling chart 500 for an access point managed peer-to-peer reuse operation is shown. The scheduling chart 500 illustrates transmission timings for the primary transmitter 202, a primary receiver 502, the access point 402, the first secondary transmitter 204, and the second secondary transmitter 206. According to the illustrative aspect of FIG. 5, the primary transmitter 202 is a non-access point node and the primary receiver 502 is a non-access point node. Additionally, the primary transmitter 202 and the primary receiver 502 may be in a P2P group. To illustrate, the primary transmitter 202 may be the station 110 in the first group of stations 104 of FIG. 1, and the primary receiver 502 may be the station 112 in the first group of stations 104.

According to the scheduling chart 500, the primary transmitter 202 may transmit a Request to Send (RTS) frame 512 to the primary receiver 502 on a designated channel at a first time. To illustrate, the station 110 of FIG. 1 may send an RTS frame to the station 112 of FIG. 1 via the P2P link 140. Upon receiving the RTS frame 512, the primary receiver 502 may transmit a Clear to Send (CTS) frame 514 to the primary transmitter 202 on the same channel at a second time. To illustrate, the station 112 of FIG. 1 may send a CTS frame to the station 110 via the P2P link 140.

Upon receiving the CTS frame 514 from the primary receiver 502, the primary transmitter 202 may send the trigger frame 412 to the access point 402 on the same channel at a third time. The illustrative aspect of FIG. 5 assumes that the primary transmitter 202 is a P2P transmitter, thus the trigger frame 412 is separated from the RTS frame 512 and from the CTS frame 514. However, if the primary transmitter 202 is a station, the trigger frame 412 may be combined into the RTS frame 512.

Upon receiving the trigger frame 412 on the channel, the access point 402 may transmit the reuse schedule frame 422 to the transmitters 202, 204, 206 on the same channel at a fourth time. The reuse schedule frame 422 may indicate that each transmitter 202, 204, 206 is to transmit data on the same channel at a fifth time (e.g., during the same time window). At the fifth time, the primary transmitter 202 may transmit the data frame 314, the first secondary transmitter 204 may transmit the data frame 222, and the second secondary transmitter 206 may transmit the data frame 232 on the same channel. Thus, based on the schedule in the reuse schedule frame 422, the primary and secondary transmitters 202, 204, 206 may simultaneously transmit data on the same channel.

Figure 6:
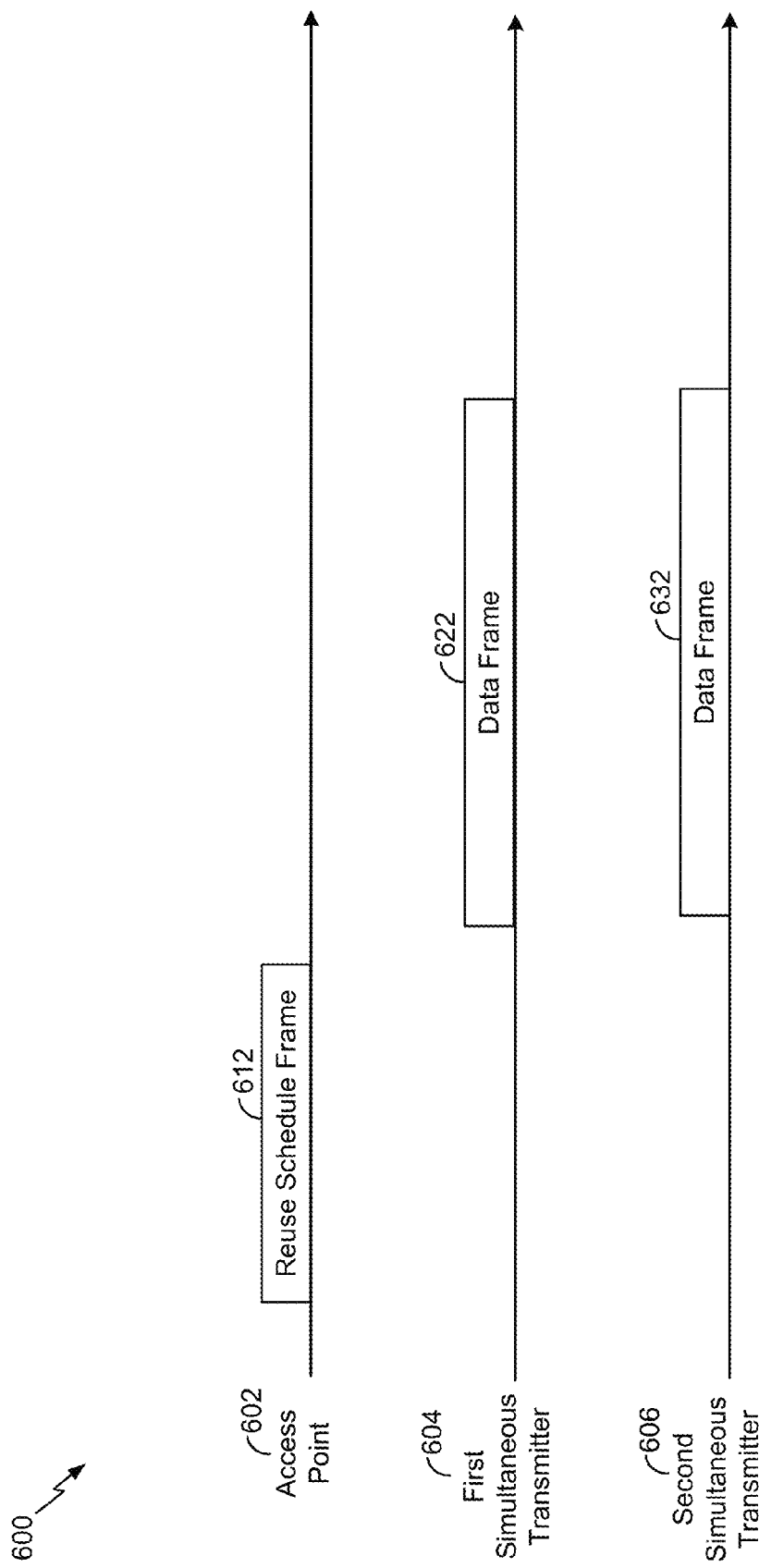
FIG. 6 is another scheduling chart for an access point managed peer-to-peer reuse operation.

Referring to FIG. 6, another particular illustrative aspect of a scheduling chart 600 for an access point managed peer-to-peer reuse operation is shown. The scheduling chart 600 illustrates transmission timings of an access point 602, a first simultaneous transmitter 604, and a second simultaneous transmitter 606.

In a particular aspect, the access point 602 may be the access point 102 of FIG. 1, the first simultaneous transmitter 604 may be any station 110-114 in the first group of stations 104 in FIG. 1, and the second simultaneous transmitter 606 may be any station 120-124 in the second group of stations 106 in FIG. 1. According to the scheduling chart 600, the access point 602 may initiate reuse and may transmit a schedule to the simultaneous transmitters 604, 606. For example, the access point 602 may transmit a reuse schedule frame 612 to the simultaneous transmitters 604, 606 at a first time on a dedicated channel. The reuse schedule frame 612 may indicate that each simultaneous transmitter 604, 606 is to transmit data on the same channel at a second time (e.g., during the same time window). At the second time, the first simultaneous transmitter 604 may transmit a data frame 622 on the same channel, and the second simultaneous transmitter 606 may transmit a data frame 632 on the same channel.

According to the scheduling charts of FIGS. 2-6, reuse schedule information (e.g., the schedule or the reuse schedule frame) is determined by an access point. The reuse schedule information may include transmitter IDs and receiver IDs. For transmitters, the reuse schedule information may include a maximum allowed transmission power per antenna and a maximum allowed number of transmit antennas to reduce (e.g., limit) interference at concurrent receivers. Additionally, the reuse schedule information may indicate a number of streams used in concurrent transmissions and a data rate (e.g., a Modulation and Coding Scheme (MCS)) per stream. The reuse schedule information may also indicate a start time, a duration, and a channel for the reuse operations. In a particular aspect, the reuse may happen in the remaining frame after the frame's PHY header which contains the schedule info as shown in FIG. 2, or the reuse may happen in the duration of the next frame after the frame containing the schedule info as shown in FIG. 3-6. The reuse schedule information may also indicate if transmissions in both directions are allowed for a link.

In one aspect, the full reuse schedule information may be transmitted for each reuse. For example, each P2P transmitter may receive the reuse schedule information associated with the other P2P transmitters. In another aspect, pre-configured reuse schedule information may be transmitted for each transmitter/receiver pair. For example, an access point may determine corresponding reuse information for a given transmitter/receiver pair (e.g., a transmitter ID/receiver ID pair) and send the reuse information to related nodes in advance. In yet another aspect, pre-configured reuse schedule information may be transmitted for each group (e.g., each group of stations or each group of P2P links). For example, an access point may assign a group ID to a particular group and send corresponding reuse information to the nodes in the particular group.

An access point may specify (in the pre-configured reuse schedule information) a start time and a duration that the schedule is valid. Additionally, the access point may optionally specify operation parameters per link in the pre-configured reuse schedule information. For example, the access point may dynamically signal a set of operation parameters in each schedule header/frame.

The reuse schedule information according to the scheduling charts of FIGS. 2-6 may be determined based on input parameters provided to the access point by the stations (e.g., the P2P transmitters). For example, each transmitting station may provide a transmission power range for the transmitting station, a path loss between the transmitting station and a receiving station, a minimum required SINR (e.g., a SINR for a target MCS), a required SINR per MCS to determine a data rate, a noise level at the receiving station to estimate SINR, a maximum allowed interference level at the receiving station to ensure the minimum required SINR, path loss information of non-interfering neighboring stations, feedback on reuse transmission performance to refine the reuse decision, OBSS interference statistics to reduce scheduling of nodes with OBSS interference, or any combination thereof. The input parameters may be transmitted to the access point via a reuse request. As an illustrative non-limiting example, the stations 110-114 in the first group of stations 104 of FIG. 1 may send reuse requests to the access point 102 via the wireless link 132, and the stations 120-124 in the second group of stations 106 of FIG. 1 may send reuse requests to the access point 102 via the wireless link 134.

Based on the input parameters of the transmitting stations, the access point may generate reuse schedule information for each set of concurrent links (e.g., each transmitting station and each receiving station). The reuse schedule information includes node IDs, maximum transmission power indicators, MCS indicators, and other operation parameters on a link-by-link basis, as described above.

Figure 7:
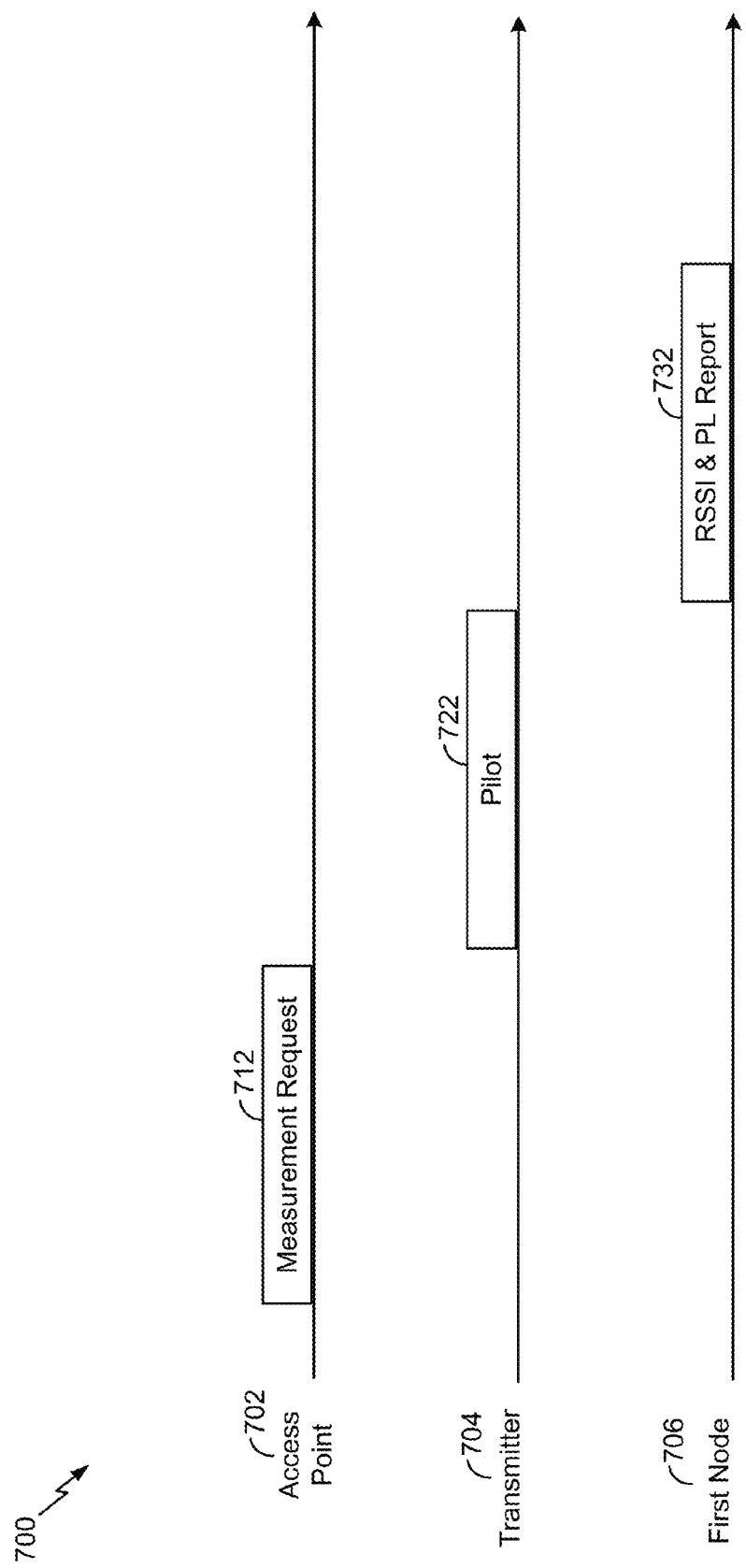
FIG. 7 is a scheduling chart for an access point retrieval of non-interfering neighbor information of a transmitting station.

Referring to FIG. 7, a particular aspect of a scheduling chart 700 for access point retrieval of non-interfering neighbor information of a transmitting station is shown. The scheduling chart 700 includes transmission timings of an access point 702, a transmitter 704, and a first node 706. In a particular aspect, the access point 702 may be the access point 102 of FIG. 1, the transmitter 704 may be the station 110 in the first group of stations 104 in FIG. 1, and the first node 706 may be the station 112 or the station 114 in the first group of stations 104 in FIG. 1.

The first node 706 may be a non-interfering neighbor of the transmitter 704. As used herein, a "non-interfering neighbor" may be a node having a maximum interference that is below an interference threshold. The maximum interference corresponds to the interference caused by the non-interfering neighbor when the non-interfering neighbor transmits at maximum power. The interference threshold may be fixed or node specific.

According to the scheduling chart 700, the access point 702 may send a measurement request 712 at a first time to the transmitter 704 and to the first node 706 on a dedicated channel. The measurement request 712 may indicate a time window for the transmitter 704 to send a pilot frame 722 to the access point 702 and a time window for the first node 706 to send a received signal strength indicator (RSSI) and path loss (PL) report 732 to the access point 702. The access point 702 may schedule nodes to report in different time slots or may request any node to report via a CSMA process if a measured RSSI of the node is less than an interference threshold.

The transmitter 704 may transmit the pilot frame 722 to the access point 702 at a second time. The transmitter 704 may specify a used transmission power in the pilot frame 722 for a path loss measurement. After receiving the pilot frame 722, the first node 706 may transmit the RSSI and PL report 732 to the access point 702 at a third time. Based on the pilot frame 722 and the RSSI and PL report 732, the access point 702 may identify nodes having an RSSI that is less than an interference threshold as the transmitter's 704 non-interfering neighbors. The access point 702 may also record the path loss of the non-interfering neighbors to the transmitter 704.

Figure 8:
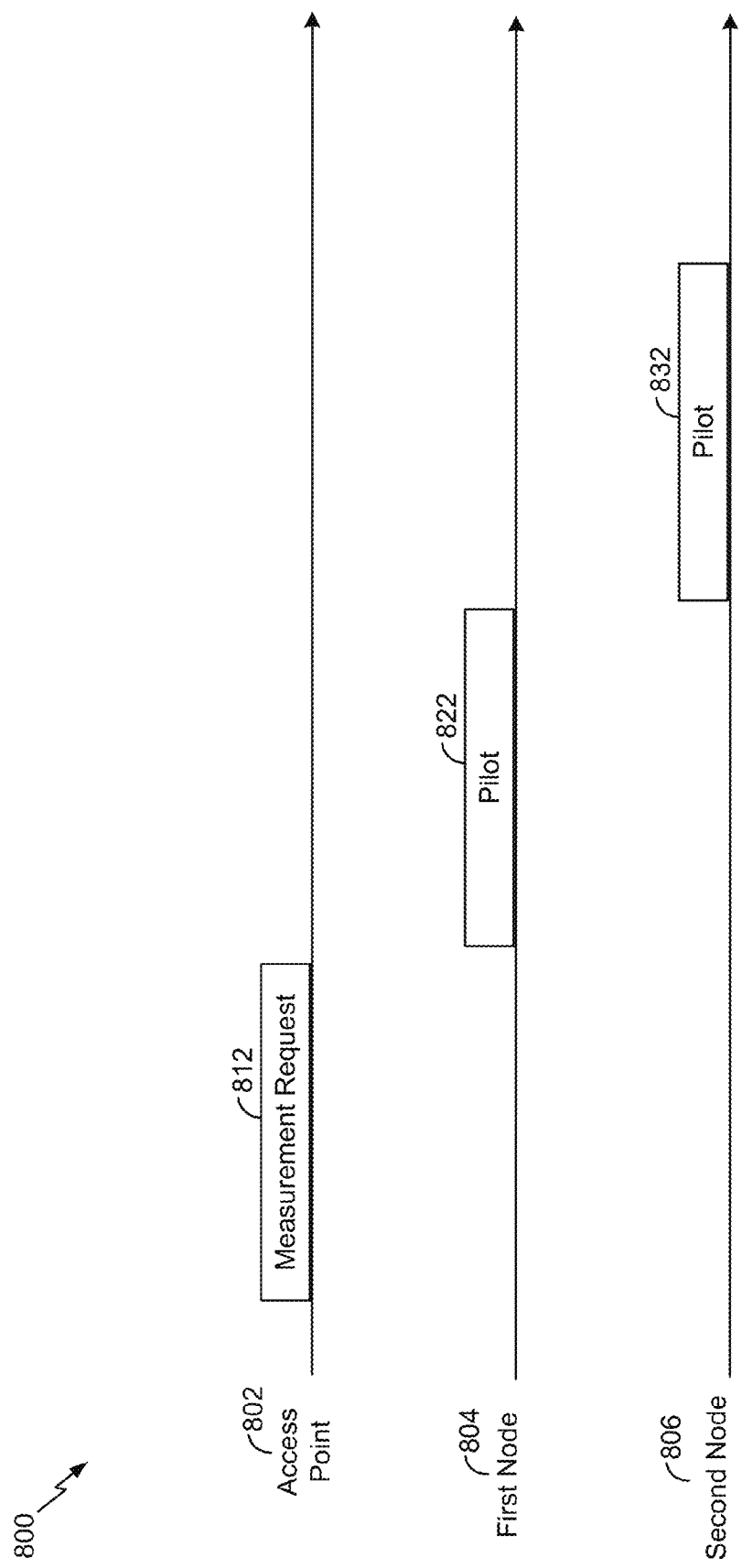
FIG. 8 is a scheduling chart for an access point retrieval of non-interfering neighbor information of a receiving station.

Referring to FIG. 8, a particular aspect of a scheduling chart 800 for access point retrieval of non-interfering neighbor information of a receiving station is shown. The scheduling chart 800 includes transmission timings of an access point 802, a first node 804, and a second node 806. In a particular aspect, the access point 802 may be the access point 102 of FIG. 1, the first node 804 may be the station 112 in the first group of stations 104 in FIG. 1 (assuming the station 110 is the transmitting station), the second node 806 may be the station 114 in the first group of stations 104 in FIG. 1, and the receiving station may be the station 120 in the second group of stations in FIG. 1.

According to the scheduling chart 800, the access point 802 may send a measurement request 812 at a first time to the first node 804 and to the second node 806 on a dedicated channel. The measurement request 812 may indicate a time window for the first node 804 to send a pilot frame 822 to the receiving station and a time window for the second node 806 to send a pilot frame 832 to the receiving station. At a second time, the receiving station may report the measured RSSI and PL from the pilot frames 822 and 832 to the access point 802. In a particular aspect, the receiving station may report nodes whose caused RSSI is less than an interference threshold. The receiving station may report identified interfering and non-interfering nodes via a sniffing procedure. Based on the RSSI report on the pilot frames 822, 832, the access point 802 may identify nodes having a RSSI that is less than the interference threshold as the receiver's non-interfering neighbors. Additionally, the access point may record the path loss from each of the non-interfering neighbors to the receiver.

Determining the reuse schedule according to the scheduling charts of FIGS. 7-8 may include selecting, at an access point, a first link (e.g., a first P2P link) and finding non-interfering neighbors of the transmitter and receiver of the first link. The access point may also compute the maximum data rate of the first link. Among the non-interfering neighbors, the access point may select a new link and a transmission power so that any previous link has the same data rate while the new link's SINR is greater than a minimum SINR. The SINR for each link with a concurrent transmission may be computed via the inputs described above. The access point may continue to add new links until a rate of any previous link drops or until a minimum SINR of the new link cannot be achieved. The access point may record the node IDs, the transmission power, and the MCS for each link.

In a particular aspect, the access point may refine reuse schedule information based on additional inputs. For example, P2P nodes may report previous reuse transmission performance information to the access point, and the previous reuse transmission performance information may be used to refine the reuse schedule information. The previous reuse transmission performance information may include throughput information, retry statistics, latency statistics, SINR, etc. Based on the previous reuse transmission performance information, the access point may change operation parameters of one or more links.

As another example, P2P nodes may report statistics of observed OBSS transmissions to the access point. The statistics may identify an occupied medium, RSSI packet duration, and hidden OBSS nodes. The statistics may be provided on a per OBSS node basis or may be provided across all OBSS transmissions. Based on the statistics, the access point may instruct one or more links to defer to an OBSS transmission, modify parameters of one or more links, or remove one or more links from the schedule.

As described above, a P2P node may send a reuse request to an access point so that the access point may consider the P2P node in a concurrent transmission schedule. The reuse request may be sent with at least one of a path loss of the P2P link, a path loss of the access point to any node in the P2P link, or a path loss of another P2P node to any node in the P2P link.

Figure 9:
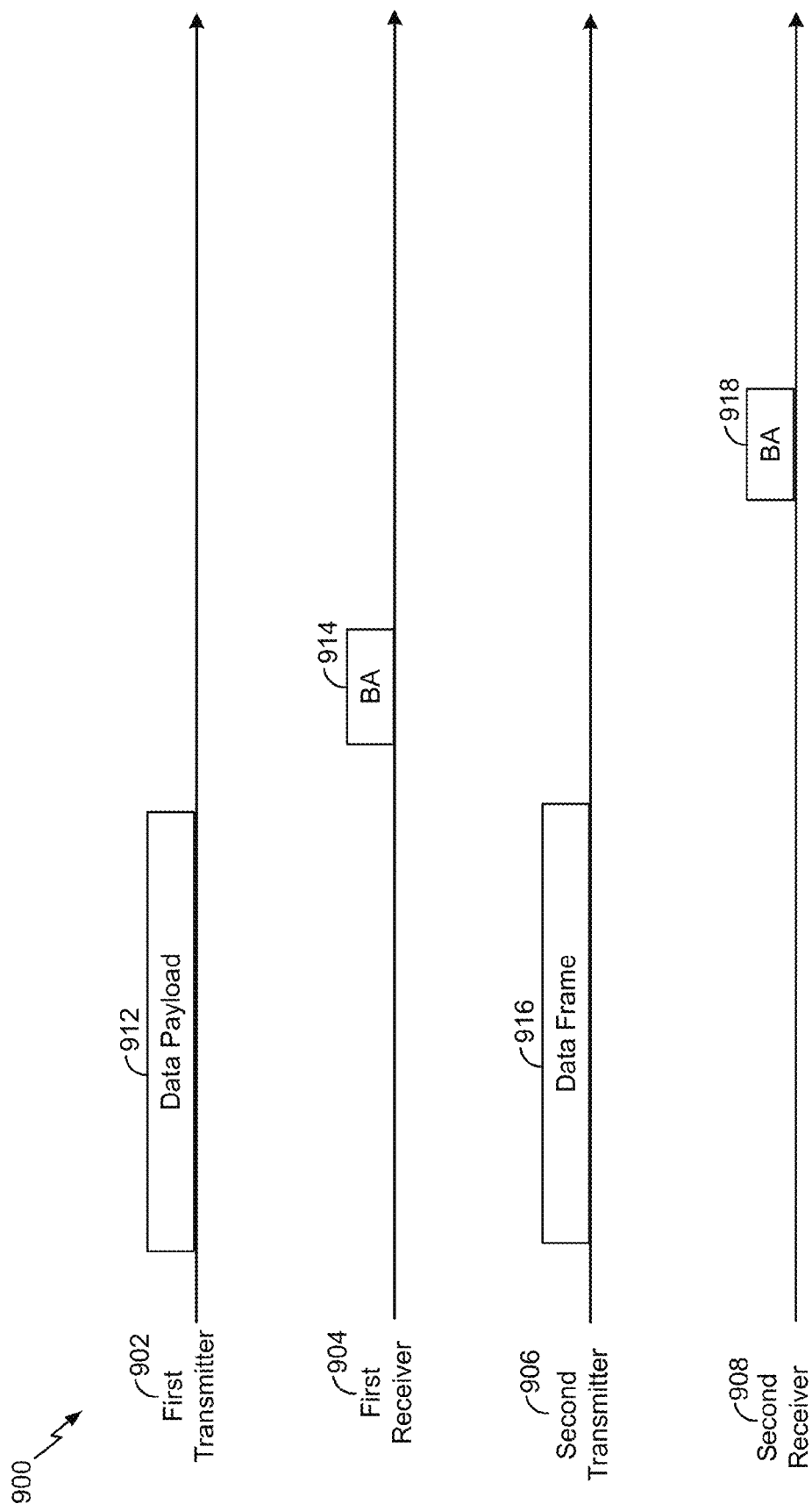
FIG. 9 is a scheduling chart for non-concurrent block acknowledgments for concurrent transmissions.

Referring to FIG. 9, a particular illustrative aspect of a scheduling chart 900 for non-concurrent block acknowledgments (BAs) for concurrent transmissions is shown. The scheduling chart 900 includes transmission timings for a first transmitter 902, a first receiver 904, a second transmitter 906, and a second receiver 908.

In a particular aspect, the first transmitter 902 may be any transmitting station in the first group of stations 104 in FIG. 1, and the first receiver 904 may be any receiving station in the first group of stations 104. For example, the first transmitter 902 may be the station 110, and the first receiver 904 may be the station 112. The second transmitter 906 may be any transmitting station in the second group of stations 106 in FIG. 1, and the second receiver 908 may be any receiving station in the second group of stations 106. For example, the second transmitter 906 may be the station 120, and the second receiver 908 may be the station 122.

According to the scheduling chart 900, the first transmitter 902 may send a data payload 912 to the first receiver 904 at a first time on a dedicated channel, and the second transmitter 906 may send a data frame 916 to the second receiver 908 at the first time on the same channel. The receivers 904, 908 may non-concurrently send block acknowledgements 914, 918 to the transmitters 902, 908 upon reception of the data frames 912, 916, respectively. For example, the first receiver 904 may send the block acknowledgement 914 to the first transmitter 902 at a second time via the same channel to acknowledge reception of the data payload 912, and the second receiver 908 may send the block acknowledgment 918 to the second transmitter 906 at a third time via the same channel to acknowledge reception of the data frame 916. In the illustrated aspect of FIG. 9, the receivers 904, 908 are scheduled to send the block acknowledgements 914, 918 in different time slots. The time schedule may be indicated in reuse schedule information or in a separate block acknowledgement schedule frame from an access point that triggers the scheduled block acknowledgement transmissions after concurrent data transmission.

In a particular aspect, one receiver (e.g., the first receiver 904) is selected to send an immediate block acknowledgement (e.g., the block acknowledgement 914), and other receivers (e.g., the second receiver 906) are solicited by a block acknowledgment request (BAR) to send the block acknowledgement (e.g., the block acknowledgment 918). The BAR may be sent by an access point or by the transmitting station (e.g., the second transmitter 906). The receiver selected to send the immediate block acknowledgment may be specified in reuse schedule information.

Figure 10:
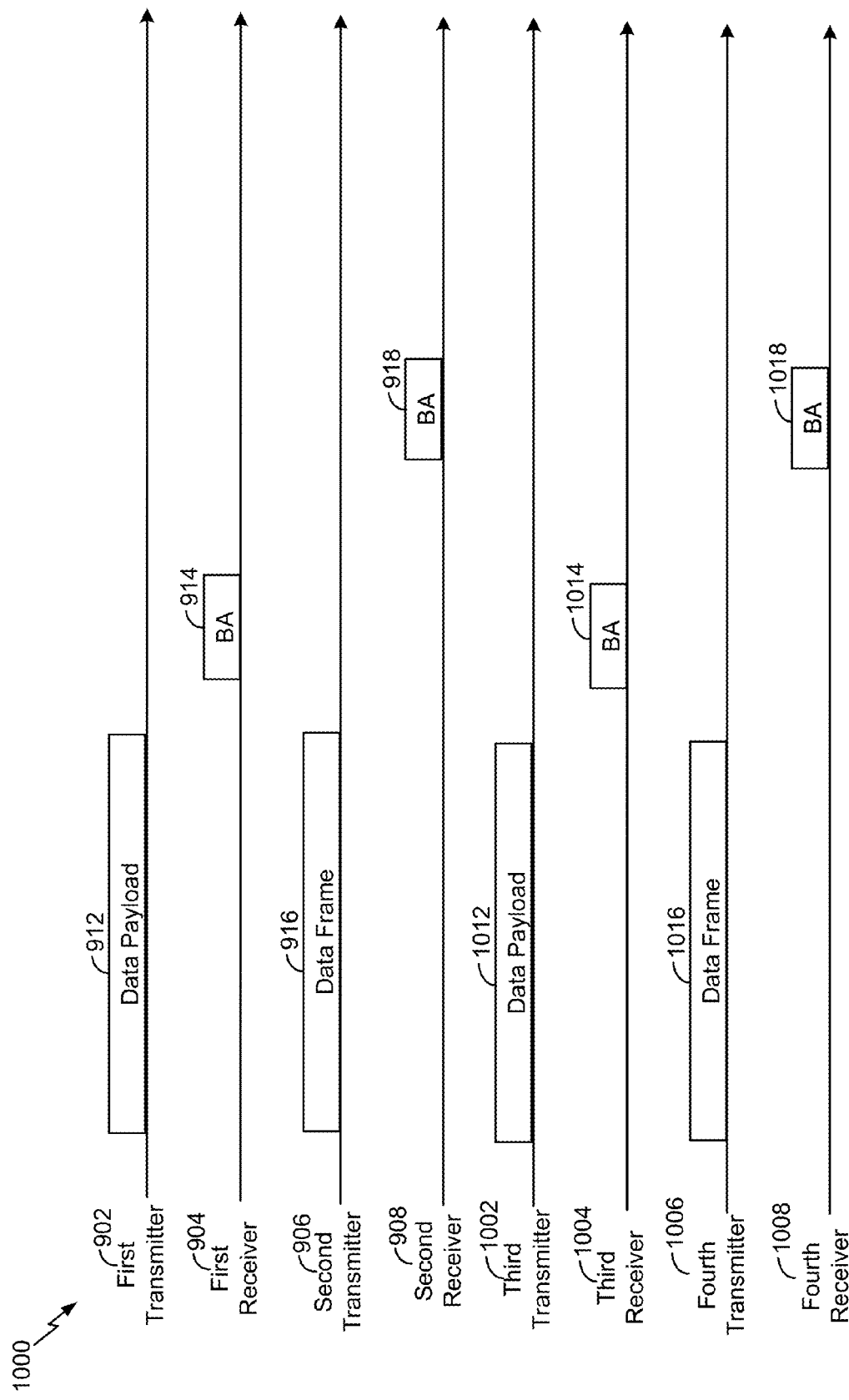
FIG. 10 is another scheduling chart for concurrent block acknowledgments for concurrent transmissions.

Referring to FIG. 10, another particular illustrative aspect of a scheduling chart 1000 for concurrent block acknowledgments for concurrent transmissions is shown. The scheduling chart 1000 includes transmission timings for the first transmitter 902, the first receiver 904, the second transmitter 906, the second receiver 908, a third transmitter 1002, a third receiver 1004, a fourth transmitter 1006, and a fourth receiver 1008.

In a particular aspect, the first transmitter 902, the first receiver 904, the third transmitter 1002, and the third receiver 1004 are in a common group of stations. For example, the first transmitter 902, the first receiver 904, the third transmitter 1002, and the third receiver 1004 may be stations in the first group of stations 104 in FIG. 1. Additionally, the second transmitter 906, the second receiver 908, the fourth transmitter 1006, and the fourth receiver 1008 are in a common group of stations. For example, the second transmitter 906, the second receiver 908, the fourth transmitter 1006, and the fourth receiver 1008 may be stations in the second group of stations 106 in FIG. 1.

The first transmitter 902, the first receiver 904, the second transmitter 906, and the second receiver 908 may operate (e.g., transmit) according to the timings in the scheduling chart 900 of FIG. 9. Additionally, the third transmitter 1002 may send a data payload 1012 to the third receiver 1004 at the first time on the dedicated channel, and the fourth transmitter 1006 may send a data frame 1016 to the fourth receiver 1008 at the first time on the same channel. Receivers in the same group may transmit block acknowledgements during the same time slot (e.g., the same time window). For example, the first and third receivers 904, 1004 may send block acknowledgments 914, 1014 to the first and third transmitters 902, 1002, respectively, at the second time on the same channel. Additionally, the second and fourth receivers 908, 1008 may send block acknowledgments 918, 1018 to the second and fourth transmitters 906, 1006, respectively, at the third time on the channel. The time schedule for sending the block acknowledgments may be indicated in reuse schedule information or in a separate block acknowledgement schedule frame from an access point that triggers the scheduled block acknowledgement transmissions after concurrent data transmission.

Figure 11:
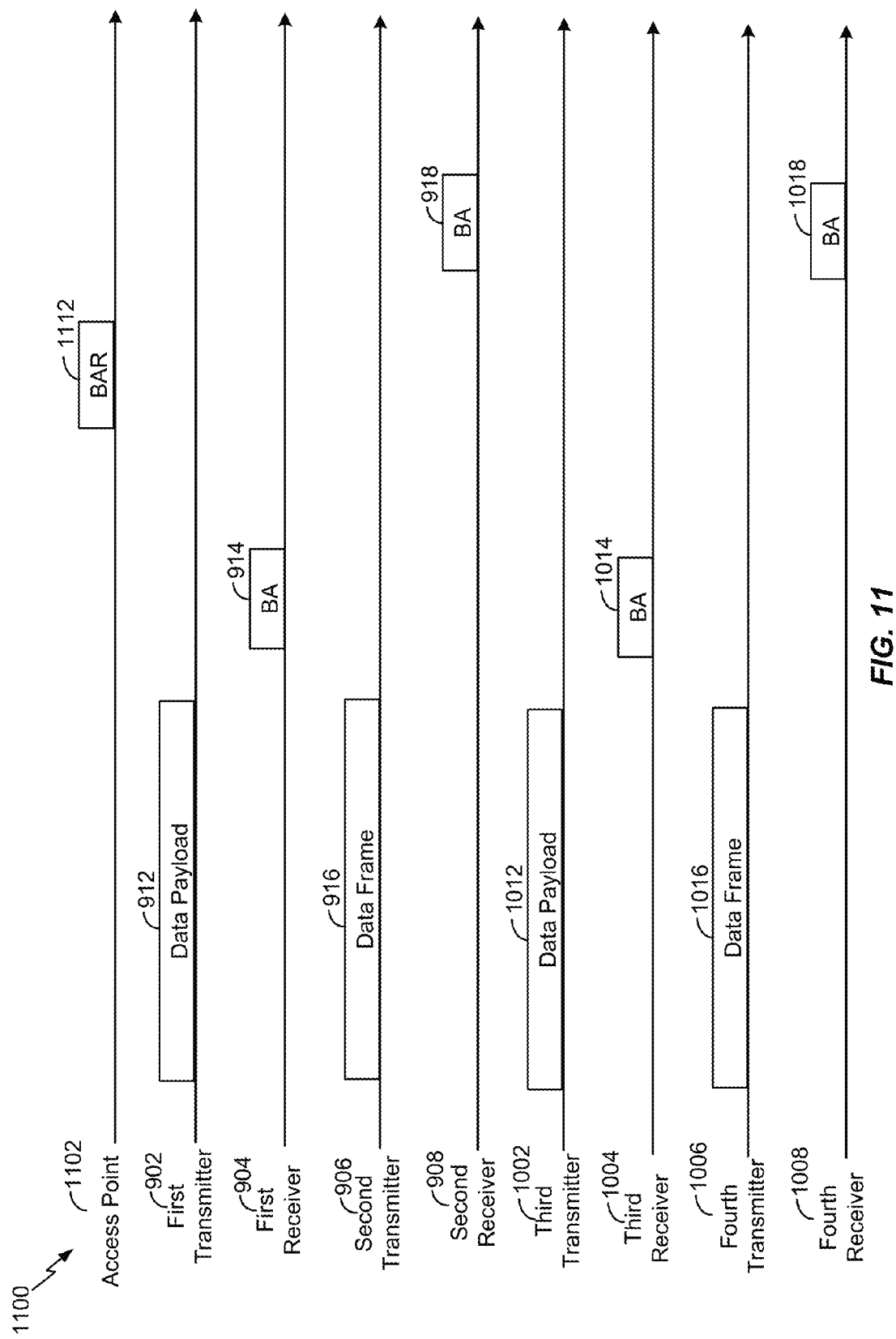
FIG. 11 is another scheduling chart for concurrent block acknowledgments for concurrent transmissions.

Referring to FIG. 11, another particular illustrative aspect of a scheduling chart 1100 for concurrent block acknowledgments for concurrent transmissions is shown. The scheduling chart 1100 includes transmission timings for an access point 1102, the first transmitter 902, the first receiver 904, the second transmitter 906, the second receiver 908, the third transmitter 1002, the third receiver 1004, the fourth transmitter 1006, and the fourth receiver 1008. In a particular aspect, the access point 1102 may be the access point 102 of FIG. 1.

The transmitters 902, 906, 1002, 1006 and the receivers 904, 908, 1004, 1008 may operate (e.g., transmit) according to the timings in the scheduling chart 1000 of FIG. 10. The access point 1102 may trigger (e.g., initiate) concurrent block acknowledgement transmissions for each group of stations. For example, the access point 1102 may send a block acknowledgement request (BAR) 1112 to the second and fourth receivers 908, 1008 to trigger concurrent transmission of the block acknowledgments 918, 1018. The block acknowledgments 914, 1014 in the other group may be scheduled to be transmitted at the second time according to reuse schedule information.

Figure 12:
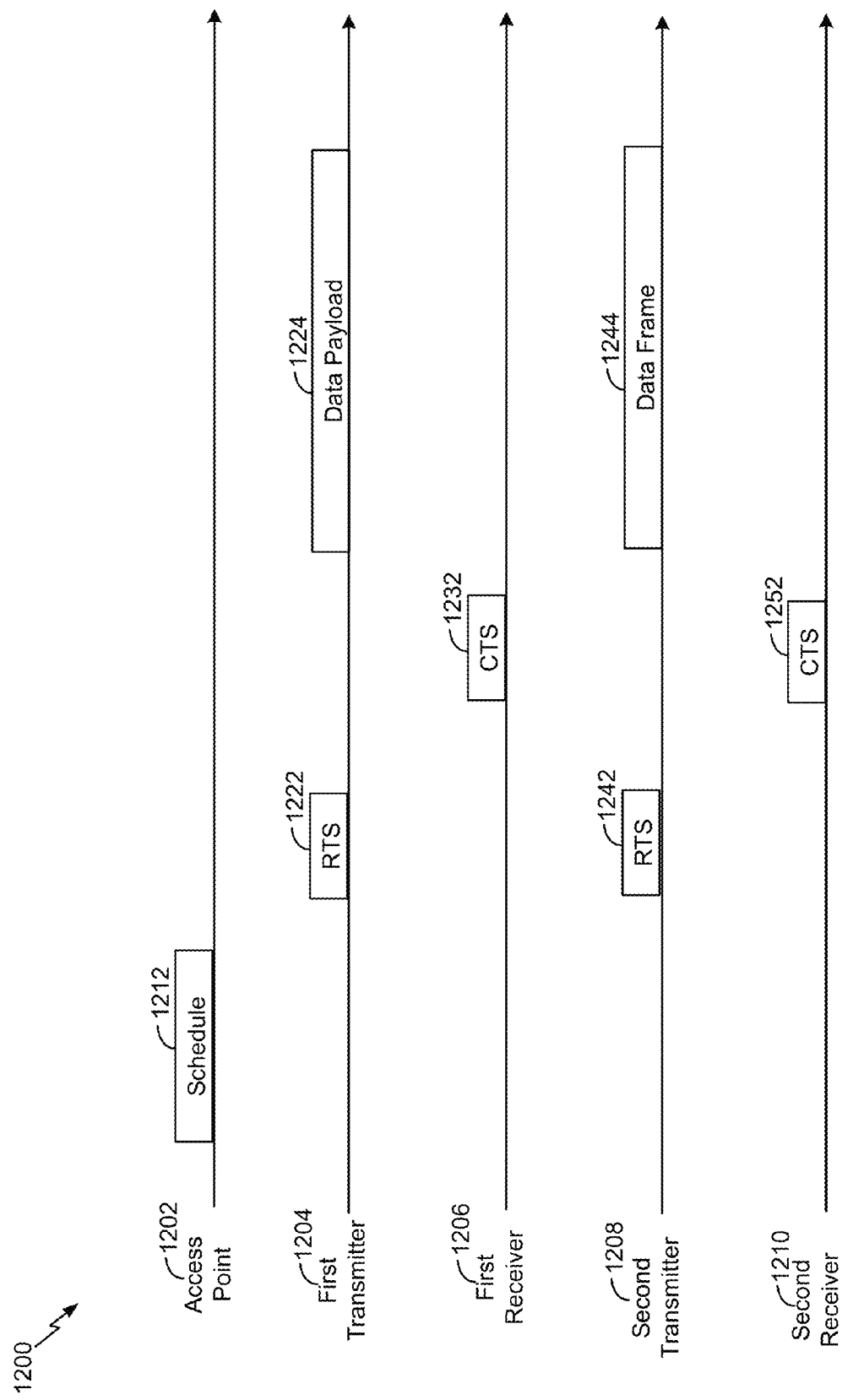
FIG. 12 is another scheduling chart for an access point managed peer-to-peer reuse operation.

Referring to FIG. 12, another particular illustrative aspect of a scheduling chart 1200 for an access point managed peer-to-peer reuse operation is shown. The scheduling chart 1200 illustrates transmissions for an access point 1202, a first transmitter 1204, a first receiver 1206, a second transmitter 1208, and a second receiver 1210.

In a particular aspect, the access point 1202 may be the access point 102 of FIG. 1, the first transmitter 1204 may be the station 110 of FIG. 1, the first receiver 1206 may be the station 112 of FIG. 1, the second transmitter 1208 may be the station 120 of FIG. 1, and the second receiver 1210 may be the station 122 of FIG. 1. According to the scheduling chart 1200, the access point 1202 may transmit a schedule 1212 to the transmitters 1204, 1208 and receivers 1206, 1210 at a first time via a dedicated channel. The schedule 1212 may indicate transmission times (e.g., transmission windows) for each transmitter 1204, 1208 and each receiver 1206, 1210 to transmit data via P2P links.

According to the schedule 1212, the first and second transmitters 1204, 1208 may transmit RTSs 1222, 1242 to the first and second receivers 1206, 1210, respectively, at a second time via the dedicated channel. Upon receiving the RTSs 1222, 1242, the first and second receivers 1206, 1210 may send CTSs 1232, 1252 to the first and second transmitters 1204, 1208, respectively, at a third time via the same channel. Upon receiving the CTSs 1232, 1252, the first transmitter 1204 may send a data payload 1224 to the first receiver 1206 via the same channel at a fourth time, and the second transmitter 1208 may concurrently send a data frame 1244 to the second receiver 1208 via the same channel. The purpose of the concurrent RTS/CTS is to protect the following concurrent data transmissions from any hidden node interference.

Thus, according to the scheduling chart 1200 of FIG. 12, the transmitters 1204, 1208 send RTSs 1222, 1242 having a same format at the same time, and the receivers send CTSs 1232, 1252 having a same format at the same time. Permission for such concurrent RTS/CTS transmissions having same formats may be specified in the reuse schedule information (e.g., the schedule 1212). In particular, the access point 1202 may specify a network allocation vector (NAV) for the RTS/CTS to cover scheduled block acknowledgments.

Figure 13:
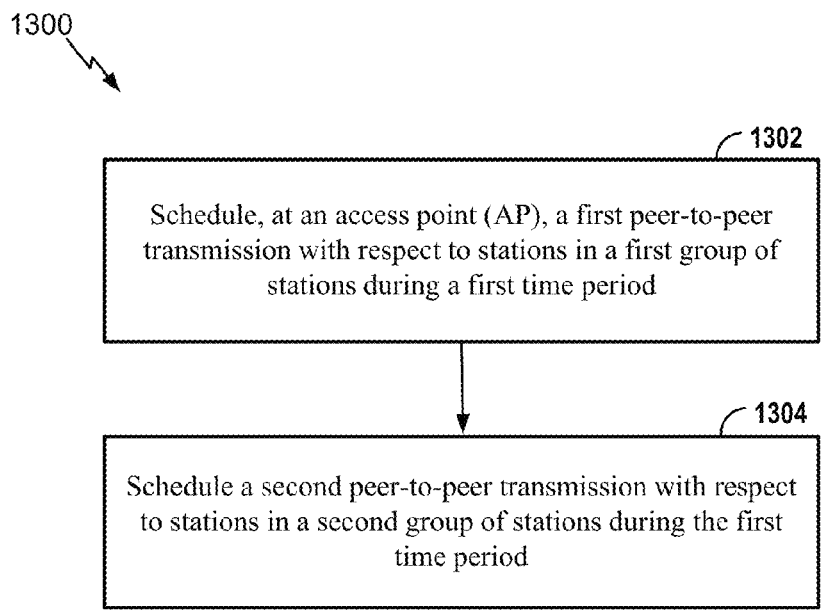
FIG. 13 is a flow diagram of an illustrative method for scheduling concurrent transmissions in a basic service set (BSS) of an Institute of Electrical and Electronics Engineers (IEEE) 802.11 architecture.

Referring to FIG. 13, a particular aspect of a method 1300 for scheduling concurrent transmissions in a wireless network is shown. The method 1300 may be performed by at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12.

The method 1300 includes scheduling, at an access point (AP), a first peer-to-peer transmission with respect to stations in a first group of stations during a first time period, at 1302. For example, referring to FIG. 1, the access point 102 may transmit the transmission management data 160 to the station 110 in the first group of stations 104. The transmission management data 160 may include a schedule (e.g., the reuse schedule frame 422 of FIG. 4) that instructs the station 110 to transmit data to the station 112 via the P2P link 140 at a first time.

A second peer-to-peer transmission with respect to stations in a second group of stations may be scheduled during the first time period, at 1304. For example, referring to FIG. 1, the access point may transmit the transmission management data 160 to the station 120 in the second group of stations 106. The transmission management data 160 may include a schedule that instructs the station 120 to transmit data to the station 122 via the P2P link 150 at the first time.

In a particular aspect, the first peer-to-peer transmission and the second peer-to-peer transmission may be scheduled on a common channel (e.g., a common frequency band). In another aspect, the first peer-to-peer transmission and the second peer-to-peer transmission may be scheduled according to an OFDMA scheme. For example, the first peer-to-peer transmission may be scheduled on a first channel (e.g., a first frequency band) and the second peer-to-peer transmission may be scheduled on a second channel (e.g., a second frequency band). In another particular aspect, the first peer-to-peer transmission and the second peer-to-peer transmission may be scheduled based on coordinated beamforming.

According to the method 1300, CSMA within the first group of stations and the second group of stations may be bypassed when scheduling the peer-to-peer transmissions. The method 1300 may also include generating first operation parameters for the first peer-to-peer transmission and generate second operation parameters for the second peer-to-peer transmission. The first and second operation parameters (included in the transmission management data 160) may include at least one of a transmission power, a transmission data rate, a transmission channel, or a beamforming target node.

According to the method 1300, the access point may also schedule an infrastructure transmission in the BSS concurrently with the peer-to-peer transmissions. The infrastructure transmission may be an uplink transmission from the access point to a wired network or a downlink transmission from the wired network to the access point. The method 1300 may also include transmitting an indication (included in the transmission management data 160) that a scheduled peer-to-peer transmission at the first time is to defer to an overlapping OBSS transmission at the first time.

The method 1300 of FIG. 13 may enable the access point 102 to manage concurrent transmissions between the stations 110-114 in the first group of stations 104 and the stations 120-124 in the second group of stations 106. Managing concurrent transmissions for multiple groups in the BSS may increase transmission efficiency in the BSS. For example, the access point 102 may ensure improvement and provide reliable signaling among P2P nodes by managing the concurrent transmissions.

Figure 14:
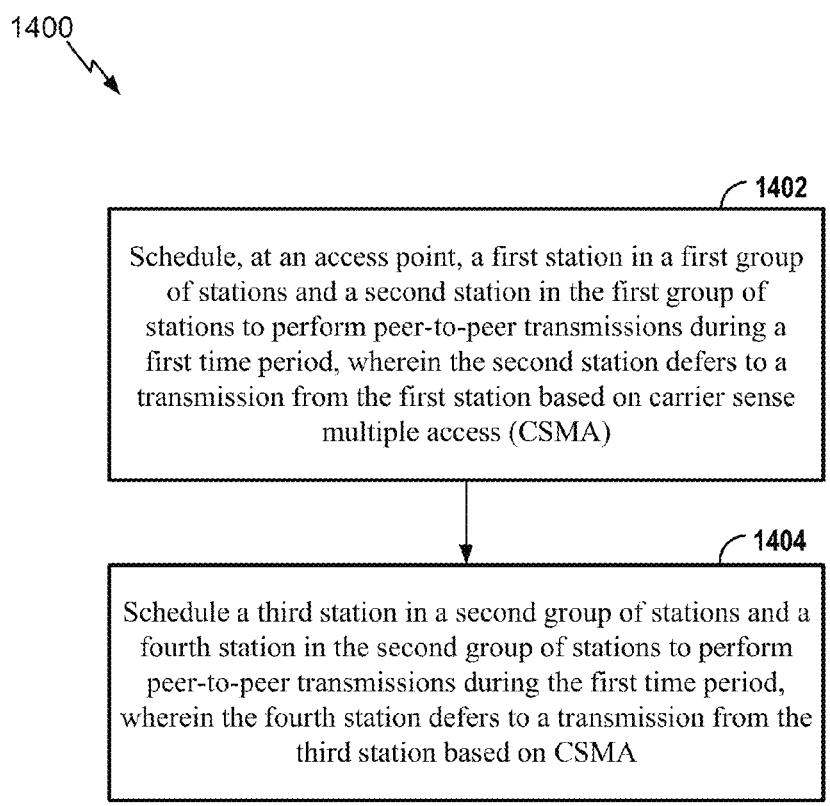
FIG. 14 is a flow diagram of another illustrative method for scheduling concurrent transmissions in a BSS of an IEEE 802.11 architecture.

Referring to FIG. 14, another particular aspect of a method 1400 for scheduling concurrent transmissions in a wireless network is shown. The method 1400 may be performed by at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12.

The method 1400 may include scheduling, at an access point, a first station in a first group of stations and a second station in the first group of stations to perform peer-to-peer transmissions during a first time period, at 1402. According to one implementation, the second station defers to a transmission from the first station based on carrier sense multiple access (CSMA). For example, referring to FIG. 1, the access point 102 may send the transmission management data 160 to the first group of stations 104. The transmission management data 160 may include a schedule that instructs the first group of stations 104 to perform a first peer-to-peer transmission at a first time. The first peer-to-peer transmission may be determined based on a first CSMA process performed by the stations 110-114 in the first group of stations 104.

The method 1400 may also include scheduling a third station in a second group of stations and a fourth station in the second group of stations to perform peer-to-peer transmissions during the first time period, at 1404. According to one implementation, the fourth station defers to a transmission from the third station based on CSMA. For example, referring to FIG. 1, the access point 102 may send the transmission management data 160 to the second group of stations 106. The transmission management data 160 may include a schedule that instructs the second group of stations 106 to perform a second peer-to-peer transmission at a second time. The second peer-to-peer transmission may be determined based on a second CSMA process performed by the stations 120-124 in the second group of stations 106.

According to the method 1400, the first CSMA process may be independent from the second CSMA process. For example, P2P nodes (e.g., stations) in the same group may defer to one another via CSMA but may ignore transmissions from other scheduled groups. The method 1400 may also include generating first operation parameters for peer-to-peer transmissions within the first group of stations and generating second operation parameters for peer-to-peer transmissions within the second group of stations. The first and second operation parameters (included in the transmission management data 160) may include at least one of CSMA parameters, enhanced distributed channel access (EDCA) parameters, energy detection thresholds, transmission power, a transmission power, a transmission data rate, a transmission channel, or a beamforming target node.

In a particular aspect, the method 1400 may include scheduling a wireless transmission between the access point and a particular station in the first group of stations during the first time period. The wireless transmission may also be referred to as an "infrastructure transmission". The wireless transmission may be schedule using a CSMA process or without using a CSMA process. The method 1400 may also include transmitting an indication (included in the transmission management data 160) that a scheduled peer-to-peer transmission at the first time is to defer to the infrastructure transmission. The method 1400 may also include transmitting an indication (included in the transmission management data 160) that peer-to-peer transmission at the first time is to defer to an OBSS transmission at the first time.

The method 1400 of FIG. 14 may enable the access point 102 to manage concurrent transmissions between the stations 110-114 in the first group of stations 104 and the stations 120-124 in the second group of stations 106. Managing concurrent transmissions for multiple groups in the BSS may increase transmission efficiency in the BSS. For example, the access point 102 may ensure improvement and provide reliable signaling among P2P nodes by managing the concurrent transmissions.

Figure 15:
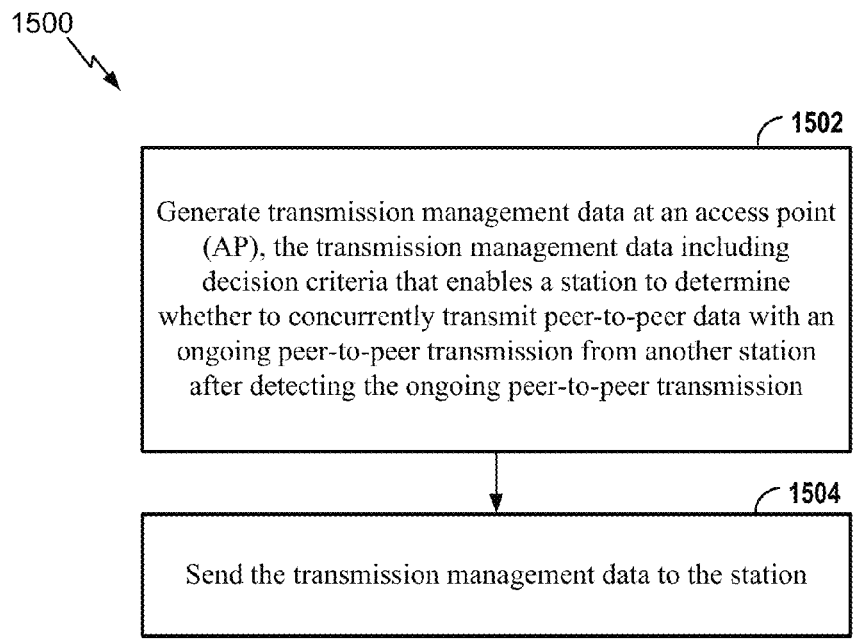
FIG. 15 is a flow diagram of another illustrative method for scheduling concurrent transmissions in a BSS of an IEEE 802.11 architecture.

Referring to FIG. 15, another particular aspect of a method 1500 for scheduling concurrent transmissions in a wireless network is shown. The method 1500 may be performed by at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12.

The method 1500 may include generating transmission management data at an access point (AP), at 1502. The transmission management data may include decision criteria that enables a station to determine whether to concurrently transmit peer-to-peer data with an ongoing peer-to-peer transmission from another station after detecting the ongoing peer-to-peer transmission. For example, referring to FIG. 1, the access point 102 may generate the transmission management data 160. The transmission management data may include decision criteria that enables the station 110 to determine whether to concurrently transmit data with an ongoing transmission from another station 120 after detecting the ongoing transmission.

According to the method 1500, a first decision criterion of the decision criteria may be satisfied if a peer-to-peer link associated with the station does not affect the ongoing transmission. For example, if a path loss from the station to a receiver to a receiver in a peer-to-peer link in the ongoing transmission fails to satisfy a threshold, the first decision criterion may be satisfied. A second decision criterion of the decision criteria may be satisfied if a peer-to-peer link associated with the station is not affected by the ongoing transmission. For example, the second decision criterion may be satisfied if a SINR of the peer-to-peer link associated with the station fails to exceed a threshold with interference associated with the ongoing transmission.

The transmission management data may be sent to the station, at 1504. For example, referring to FIG. 1, the access point 102 may send the transmission management data 160 to the station 110. The station 110 may determine whether to concurrently transmit data with the ongoing transmission without using a CSMA process.

According to the method 1500, the access point may additionally generate operation parameters for a first peer-to-peer transmission associated with the station. The operation parameters (included in the transmission management data 160) may include at least one of a transmission power, a transmission data rate, a transmission channel, or a beamforming target node. In a particular aspect, the operation parameters may be dependent on the ongoing transmission. The method 1500 may also include transmitting an indication (included in the transmission management data 160) that a scheduled peer-to-peer transmission is to defer to an overlapping OBSS transmission.

The method 1500 of FIG. 15 may enable the access point 102 to manage concurrent transmissions between the stations 110-114 in the first group of stations 104 and the stations 120-124 in the second group of stations 106. Managing concurrent transmissions for multiple groups in the BSS may increase transmission efficiency in the BSS. For example, the access point 102 may ensure improvement and provide reliable signaling among P2P nodes by managing the concurrent transmissions.

Figure 16:
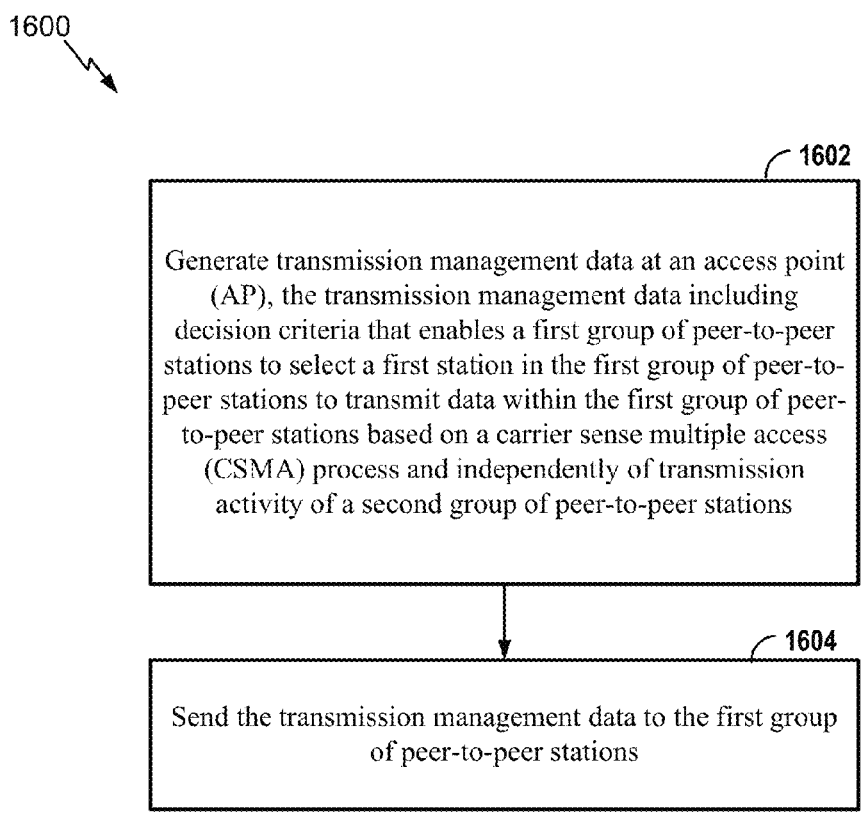
FIG. 16 is a flow diagram of another illustrative method for scheduling concurrent transmissions in a BSS of an IEEE 802.11 architecture.

Referring to FIG. 16, another particular aspect of a method 1600 for scheduling concurrent transmissions in a wireless network is shown. The method 1600 may be performed by at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12.

The method 1600 may include generating transmission management data at an access point (AP), at 1602. The transmission management data may include decision criteria that enables a first group of peer-to-peer stations to select a first station in the first group of peer-to-peer stations based on a CSMA process and independently of transmission activity of a second group of peer-to-peer stations. For example, referring to FIG. 1, the access point 102 may generate the transmission management data 160. The transmission management data 160 may include decision criteria that enable the first group of stations 104 in the BSS to select the station 110 to concurrently transmit data with an ongoing transmission from the station 120 in the second group of stations 106 in the BSS. The first group of stations 104 may select the station 110 based on a CSMA process and independently of transmission activity in the second group of stations 106.

According to the method 1600, a first decision criterion of the decision criteria may be satisfied if any transmission in the first group of stations does not affect the second group of stations. For example, the first decision criterion may be satisfied if a path loss from any transmitting station in the first group of stations to any receiving station in the second group of stations fails to satisfy a threshold. A second decision criterion may be satisfied if any transmission in the first group of stations is not affected by any transmission in the second group of stations. For example, the second decision criterion may be satisfied if a SINR of a peer-to-peer link associated with the first group of stations fails to exceed a threshold with interference from the second group of stations.

The transmission management data may be sent to the first group of stations, at 1604. For example, referring to FIG. 1, the access point 102 may send the transmission management data 160 to the first group of stations 104.

According to the method 1600, the access point may generate operation parameters for a peer-to-peer transmission associated with the first group of stations. The operation parameters (included in the transmission management data 160) includes at least one of CSMA parameters, EDCA parameters, energy detection thresholds, a transmission power, a transmission data rate, a transmission channel, or a beamforming target node. The operation parameters may be dependent on the second group of stations. The access point may also indicate that a scheduled peer-to-peer transmission defer to an infrastructure transmission. The access point may also indicate that a scheduled peer-to-peer transmission defer to an OBSS transmission.

The method 1600 of FIG. 16 may enable the access point 102 to manage concurrent transmissions between the stations 110-114 in the first group of stations 104 and the stations 120-124 in the second group of stations 106. Managing concurrent transmissions for multiple groups in the BSS may increase transmission efficiency in the BSS. For example, the access point 102 may ensure improvement and provide reliable signaling among P2P nodes by managing the concurrent transmissions.

Figure 17:
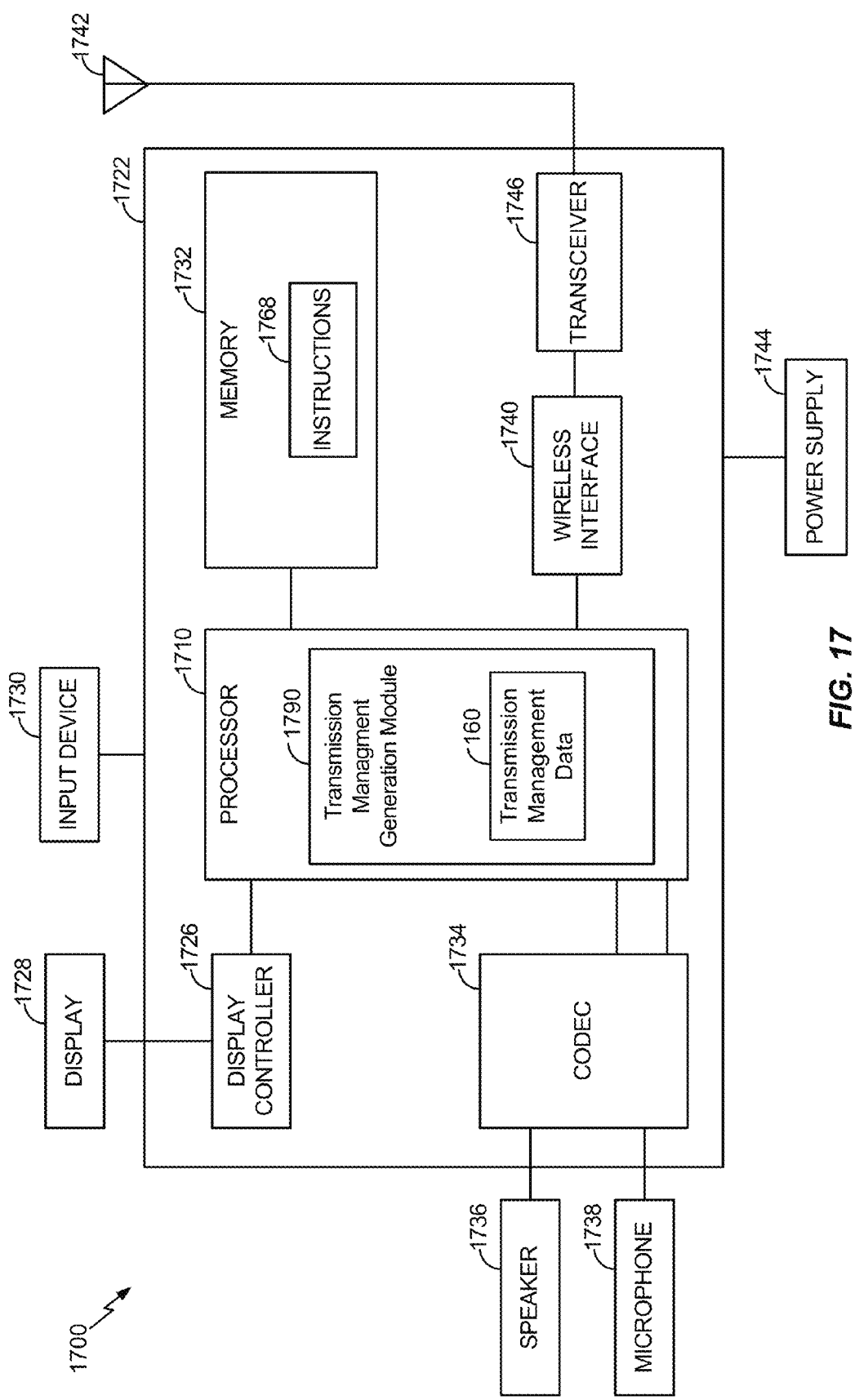
FIG. 17 is a diagram of an access point that is operable to support various aspects of one or more methods, systems, apparatuses, and/or computer-readable media disclosed herein.

Referring to FIG. 17, a block diagram of a particular illustrative aspect of an access point is depicted and generally designated 1700. The access point 1700 includes a processor 1710, such as a digital signal processor (DSP), a central processing unit (CPU), and/or a network processing unit (NPU), coupled to a memory 1732. In a particular aspect, the access point 1700, or components thereof, may correspond to at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12.

The processor 1710 may be configured to execute software (e.g., a program of one or more instructions 1768) stored in the memory 1732. Additionally or alternatively, the processor 1710 may be configured to implement one or more instructions stored in a memory of a wireless interface 1740 (e.g., an IEEE 802.11 wireless interface). The processor 1710 may be configured to operate in accordance with one or more of the methods 1300-1600 of FIGS. 13-16. For example, the processor 1710 may include a transmission management generation module 1790 to execute one or more of the methods 1300-1600 of FIGS. 13-16.

The wireless interface 1740 may be coupled to the processor 1710 and to an antenna 1742. For example, the wireless interface 1740 may be coupled to the antenna 1742 via a transceiver 1746, such that wireless data received via the antenna 1742 may be provided to the processor 1710.

A coder/decoder (CODEC) 1734 can also be coupled to the processor 1710. A speaker 1736 and a microphone 1738 can be coupled to the CODEC 1734. A display controller 1726 can be coupled to the processor 1710 and to a display device 1728. In a particular aspect, the processor 1710, the display controller 1726, the memory 1732, the CODEC 1734, and the wireless interface 1740, are included in a system-in-package or system-on-chip device 1722. In a particular aspect, an input device 1730 and a power supply 1744 are coupled to the system-on-chip device 1722. Moreover, in a particular aspect, as illustrated in FIG. 17, the display device 1728, the input device 1730, the speaker 1736, the microphone 1738, the antenna 1742, and the power supply 1744 are external to the system-on-chip device 1722. However, each of the display device 1728, the input device 1730, the speaker 1736, the microphone 1738, the antenna 1742, and the power supply 1744 can be coupled to one or more components of the system-on-chip device 1722, such as one or more interfaces or controllers.

In conjunction with the described aspects, a first apparatus includes means for scheduling a first peer-to-peer transmission with respect to stations in a first group of stations during a first time period. For example, the means for scheduling the first peer-to-peer transmission may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, the instructions 1768 executable by the processor 1710 of FIG. 14, or any combination thereof.

The first apparatus may also include means for scheduling a second peer-to-peer transmission with respect to stations in a second group of stations during the first time period. For example, the means for scheduling the second peer-to-peer transmission may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, the instructions 1768 executable by the processor 1710 of FIG. 14, or any combination thereof.

In conjunction with the described aspects, a second apparatus includes means for scheduling a first group of stations to perform peer-to-peer transmissions during a first time period. The means for scheduling the first group of stations to perform first peer-to-peer transmissions may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, the instructions 1768 executable by the processor 1710 of FIG. 14, or any combination thereof. A station in the first group of stations may defer to a transmission from another station in the first group of stations based on CSMA.

The second apparatus may also include means for scheduling a second group of stations to perform peer-to-peer transmissions during the first time period. For example, the means for scheduling the second group of stations to perform peer-to-peer transmissions may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, the instructions 1768 executable by the processor 1710 of FIG. 14, or any combination thereof. A station in the second group of stations may defer to a transmission from another station in the second group of stations based on CSMA.

In conjunction with the described aspects, a third apparatus includes means for generating transmission management data. For example, the means for generating the transmission management data may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, the instructions 1768 executable by the processor 1710 of FIG. 14, or any combination thereof. The transmission management data may include decision criteria that enables a station to determine whether to concurrently transmit peer-to-peer data with an ongoing peer-to-peer transmission from another station after detecting the ongoing peer-to-peer transmission.

The third apparatus may also include means for sending the transmission management data to the station. For example, the means for sending the transmission management data may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, wireless interface 1740 of FIG. 17, the transceiver 1746 of FIG. 17, the antenna 1742 of FIG. 17, or any combination thereof.

In conjunction with the described aspects, a fourth apparatus includes means for generating transmission management data. For example, the means for generating the transmission management data may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, the instructions 1768 executable by the processor 1710 of FIG. 14, or any combination thereof. The transmission management data may include decision criteria that enables a first group of peer-to-peer stations to select a first station in the first group of peer-to-peer stations to transmit data within the first group of peer-to-peer stations based on a CSMA process and independently of transmission activity in a second group of peer-to-peer stations.

The fourth apparatus may also include means for sending the transmission management data to the first group of peer-to-peer stations. For example, the means for sending the transmission management data may include at least one of the access point 102 of FIG. 1, the primary transmitter 202 of FIGS. 2-5, the access point 602 of FIG. 6, the access point 702 of FIG. 7, the access point 802 of FIG. 8, the access point 1102 of FIG. 11, or the access point 1202 of FIG. 12, the access point 1700 of FIG. 17, the transmission management generation module 1790 of FIG. 17, wireless interface 1740 of FIG. 17, the transceiver 1746 of FIG. 17, the antenna 1742 of FIG. 17, or any combination thereof.

Those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method for scheduling concurrent transmissions, the method comprising:
scheduling, at an access point, a first station in a first group of stations and a second station in the first group of stations to perform peer-to-peer transmissions during a first time period, wherein the second station defers to a transmission from the first station based on a first carrier sense multiple access (CSMA) process; and
scheduling, at the access point, a third station in a second group of stations and a fourth station in the second group of stations to perform peer-to-peer transmissions during the first time period, wherein the fourth station defers to a transmission from the third station based on a second CSMA process that is independent from the first CSMA process.

2. The method of claim 1, wherein the access point is included in a basic service set (BSS) of an Institute of Electrical and Electronics Engineers (IEEE) 802.11 architecture.

3. The method of claim 1, further comprising:
generating first operation parameters for peer-to-peer transmissions within the first group of stations; and
generating second operation parameters for peer-to-peer transmissions within the second group of stations.

4. The method of claim 3, wherein the first operation parameters include at least one of CSMA parameters, Enhanced Distributed Channel Access (EDCA) parameters, energy detection thresholds, a transmission power, a transmission data rate, a transmission channel, or a beamforming target node.

5. The method of claim 1, further comprising scheduling a wireless transmission between the access point and a particular station in the first group of stations during the first time period.

6. The method of claim 5, wherein the wireless transmission is scheduled using a CSMA process.

7. The method of claim 5, wherein the wireless transmission is scheduled without using a CSMA process.

8. The method of claim 1, further comprising transmitting an indication that a peer-to-peer transmission in the first group of stations during the first time period is to defer to a wireless transmission between the access point and a particular station in the first group of stations.

9. The method of claim 1, further comprising transmitting an indication that a peer-to-peer transmission in the first group of stations during the first time period is to defer to an overlapping basic service set (OBSS) transmission.

10. An access point comprising:
a processor; and
a memory storing instructions executable by the processor to perform operations comprising:
scheduling a first station in a first group of stations and a second station in the first group of stations to perform peer-to-peer transmissions during a first time period, wherein the second station defers to a transmission from the first station based on a first carrier sense multiple access (CSMA) process; and
scheduling a third station in a second group of stations and a fourth station in the second group of stations to perform peer-to-peer transmissions during the first time period, wherein the fourth station defers to a transmission from the third station based on a second CSMA process that is independent from the first CSMA process.

11. The access point of claim 10, wherein the operations further comprise:
generating first operation parameters for peer-to-peer transmissions within the first group of stations; and
generating second operation parameters for peer-to-peer transmissions within the second group of stations.

12. The access point of claim 11, wherein the first operation parameters include at least one of energy detection thresholds, a transmission power, a transmission data rate, a transmission channel, or a beamforming target node.

13. The access point of claim 10, wherein the operations further comprise scheduling a wireless transmission between the access point and a particular station in the first group of stations during the first time period, and wherein the wireless transmission is scheduled using a CSMA process.

14. The access point of claim 10, wherein the operations further comprise scheduling a wireless transmission between the access point and a particular station in the first group of stations during the first time period, and wherein the wireless transmission is scheduled without using a CSMA process.

15. The access point of claim 10, wherein the operations further comprise transmitting an indication that a peer-to-peer transmission in the first group of stations during the first time period is to defer to a wireless transmission between the access point and a particular station in the first group of stations.

16. The access point of claim 10, wherein the operations further comprise transmitting an indication that a peer-to-peer transmission in the first group of stations during the first time period is to defer to an overlapping basic service set (OBSS) transmission.

17. A non-transitory computer-readable medium comprising instructions for scheduling concurrent transmissions, the instructions, when executed by a processor at an access point, cause the processor to perform operations including:
scheduling, at the access point, a first station in a first group of stations and a second station in the first group of stations to perform peer-to-peer transmissions during a first time period, wherein the second station defers to a transmission from the first station based on a first carrier sense multiple access (CSMA) process; and
scheduling, at the access point, a third station in a second group of stations and a fourth station in the second group of stations to perform peer-to-peer transmissions during the first time period, wherein the fourth station defers to a transmission from the third station based on a second CSMA process that is independent from the first CSMA process.

18. The non-transitory computer-readable medium of claim 17, wherein the operations further comprise:
generating first operation parameters for peer-to-peer transmissions within the first group of stations; and
generating second operation parameters for peer-to-peer transmissions within the second group of stations.

19. The non-transitory computer-readable medium of claim 18, wherein the first operation parameters include a beamforming target node.

20. The non-transitory computer-readable medium of claim 17, wherein the operations further comprise scheduling a wireless transmission between the access point and a particular station in the first group of stations during the first time period.

21. An access point comprising:
means for scheduling a first station in a first group of stations and a second station in the first group of stations to perform peer-to-peer transmissions during a first time period, wherein the second station defers to a transmission from the first station based on a first carrier sense multiple access (CSMA) process; and
means for scheduling a third station in a second group of stations and a fourth station in the second group of stations to perform peer-to-peer transmissions during the first time period, wherein the fourth station defers to a transmission from the third station based on a second CSMA process that is independent from the first CSMA process.

22. The access point of claim 21, further comprising means for scheduling a wireless transmission between the access point and a particular station in the first group of stations during the first time period.

23. The method of claim 1, wherein the first CSMA process is unaffected by the peer-to-peer transmissions scheduled for performance by the third station and the fourth station.

24. The method of claim 23, wherein the second CSMA process is unaffected by the peer-to-peer transmissions scheduled for performance by the first station and the second station.

25. The method of claim 1, further comprising transmitting data indicating the scheduling from the access point to the first group of stations and to the second group of stations.

26. The method of claim 1, further comprising transmitting data from the access point to the first group of stations and to the second group of stations, the data indicating a first CSMA parameter associated with the first group of stations and a second CSMA parameter associated with the second group of stations.

* * * * *